United States Patent
Shimojo et al.

(10) Patent No.: US 7,439,700 B2
(45) Date of Patent: Oct. 21, 2008

(54) CONTROL SYSTEM

(75) Inventors: Kanako Shimojo, Saitama-ken (JP); Yuji Yasui, Saitama-ken (JP)

(73) Assignee: Honda Motor Co., Ltd., Tokyo (JP)

(*) Notice: Subject to any disclaimer, the term of this patent is extended or adjusted under 35 U.S.C. 154(b) by 70 days.

(21) Appl. No.: 11/659,614

(22) PCT Filed: Sep. 9, 2005

(86) PCT No.: PCT/JP2005/016603

§ 371 (c)(1),
(2), (4) Date: Feb. 7, 2007

(87) PCT Pub. No.: WO2006/030706

PCT Pub. Date: Mar. 23, 2006

(65) Prior Publication Data

US 2007/0290648 A1   Dec. 20, 2007

(30) Foreign Application Priority Data

Sep. 13, 2004 (JP) .............................. 2004-265022

(51) Int. Cl.
- *H02P 29/00* (2006.01)
- *F02D 13/02* (2006.01)
- *G05B 13/02* (2006.01)

(52) U.S. Cl. .................. 318/650; 318/798; 123/478; 123/479

(58) Field of Classification Search .......... 318/560, 318/798, 650; 60/272, 285, 277; 123/445, 123/478, 352, 361, 693, 479; 180/179
See application file for complete search history.

(56) References Cited

U.S. PATENT DOCUMENTS

| | | | | |
|---|---|---|---|---|
| 5,373,826 A | * | 12/1994 | Taruya et al. | 123/634 |
| 5,874,813 A | * | 2/1999 | Bode et al. | 318/98 |
| 6,021,767 A | * | 2/2000 | Yasui et al. | 60/276 |
| 6,175,220 B1 | * | 1/2001 | Billig et al. | 323/239 |
| 6,278,622 B1 | * | 8/2001 | Shimazaki et al. | 363/37 |
| 7,245,163 B2 | * | 7/2007 | Nakamura | 327/110 |
| 2007/0152641 A1 | * | 7/2007 | Kusafuka et al. | 322/28 |

FOREIGN PATENT DOCUMENTS

| | | | |
|---|---|---|---|
| JP | 05302563 A | * | 11/1993 |
| JP | 2004-102441 A | | 4/2002 |
| JP | 2003-92896 A | | 3/2003 |
| JP | 2003-208725 A | | 7/2003 |

\* cited by examiner

*Primary Examiner*—Lincoln Donovan
*Assistant Examiner*—Eduardo Colon Santana
(74) *Attorney, Agent, or Firm*—Arent Fox LLP.

(57) ABSTRACT

A control system which is capable of avoiding an overloaded state of an actuator without using sensors or the like. An ECU 2 of the control system 1 calculates a lift control input U_Liftin to a variable valve lift mechanism 50 with an algorithm expressed by equations (2) to (5), such that the valve lift Liftin follows up a target valve lift Liftin_cmd, calculates a cumulative value Simot by cumulative calculation of the product of the value Imot of electric current flowing through the variable valve lift mechanism 50 and a sampling time period Stime, and when SImot≧Simot_J1 holds, sets two parameters pole_f_lf and ploe_lf to respective predetermined failure-time parameters pole_f_lf_J1 and ploe_lf_J1 which cause the lift control input U_Liftin to become smaller than when Simot<Simot_J1 holds.

11 Claims, 19 Drawing Sheets

(a)

(b)

CONTROL SYSTEM

FIELD OF THE INVENTION

The present invention relates to a control system for controlling the control amount via an actuator that converts supply power into a driving force.

BACKGROUND ART

Conventionally, a control system described in Patent Literature 1 is known which controls assist torque for assisting the steering force of the driver via an electrically-driven power steering device as an actuator. The electrically-driven power steering device includes an electric motor that generates assist torque, and the control system includes a thermistor that detects the temperature of the electric motor, and a vehicle speed sensor that detects vehicle speed.

The control system determines application voltage to the electric motor, based on the temperature of the electric motor, which is detected by the thermistor, and the vehicle speed detected by the vehicle speed sensor, thereby controlling the assist torque. First, the temperature of the electric motor is compared with a predetermined upper limit value, and when the temperature of the electric motor is lower than the upper limit value, the temperature of the electric motor is compared with a predetermined warning temperature lower than the upper limit value. Then, according to the vehicle speed, a table for a temperature range lower than the warning temperature is searched when the temperature of the electric motor is lower than the warning temperature, and a table for a temperature range not lower than the warning temperature is searched when the temperature of the electric motor is not lower than the predetermined warning temperature, whereby the application voltage is calculated.

On the other hand, when the temperature of the electric motor is not lower than the upper limit value, it is determined that the temperature of the electric motor has reached burning temperature, and hence the application voltage is set to a value of 0. This stops the electric motor from rotating thereafter, whereby overload operation of the electric motor is avoided, and the burnout of the electric motor is avoided.

Further, another control system as described in Patent Literature 2 is known which controls assist torque via an electrically-driven power steering device including an electric motor. This control system includes an ambient temperature sensor that detects the ambient temperature of the electric motor, a steering torque sensor that detects steering torque, a vehicle speed sensor that detects vehicle speed, and so forth.

The control system determines supply current to the electric motor, based on the steering torque detected by the steering torque sensor and the vehicle speed detected by the vehicle speed sensor, thereby controlling the assist torque. Further, to avoid overload operation of the electric motor, the temperature of the electric motor is estimated based on the square of the value of electric current flowing through the electric motor and the ambient temperature of the electric motor, and when the estimated temperature is higher than a reference value, the supply current to the electric motor is restricted. This makes it possible to avoid overload operation of the electric motor, and the burnout of the electric motor.

[Patent Literature 1] Japanese Laid-Open Patent Publication (Kokai) No. H07-112666

[Patent Literature 2] Japanese Laid-Open Patent Publication (Kokai) No. 2003-284375

In the control system of Patent Literature 1, the thermistor for detecting the temperature of the electric motor is required, which increases the manufacturing cost, and when the thermistor becomes faulty, there is a fear that the electric motor enters an overloaded state, and failure, such as the burnout of the electric motor, is brought about. Further, it is difficult in design to provide the thermistor for detecting the temperature at a rotating part of the electric motor, and hence after all, the temperature at a location having correlation to the coil temperature of the electric motor is detected. As a result, there is a fear of the temperature measurement being delayed to delay the detection of an overloaded state of the electric motor.

Further, in the control system of Patent Literature 2, in calculation of the estimated temperature, the square of the value of electric current flowing through the electric motor is used, variation in the estimated temperature due to a change in the value of electric current is increased. Therefore, in determination for avoiding overheat of the electric motor, it is difficult to properly set the reference value which is to be compared with the estimated temperature, which can bring about an error in the determination. In addition, the ambient temperature sensor is required, which increases the manufacturing cost, and when the ambient temperature sensor is faulty, it becomes impossible to properly estimate the temperature of the electric motor.

The present invention has been made to provide a solution to the above-described problems, and an object thereof is to provide a control system which is capable of avoiding an overloaded state of an actuator without using sensors or the like.

DISCLOSURE OF THE INVENTION

To attain the above object, in a first aspect of the present invention, there is provided a control system for controlling a control amount via an actuator that converts supply power into a driving force, comprising control amount-detecting means for detecting the control amount, target control amount-setting means for setting a target control amount as a target to which the control amount is controlled, supply power-calculating means for calculating the supply power to the actuator with a predetermined control algorithm such that the detected control amount follows up the target control amount, power parameter-detecting means for detecting a power parameter indicative of electric power actually supplied to the actuator, load parameter-calculating means for calculating a load parameter indicative of load on the actuator, based on the detected power parameter, and first determination means for determining whether or not the load parameter is not smaller than a first predetermined reference value, wherein the predetermined control algorithm includes at least one of a follow-up parameter that determines a follow-up property of the control amount to the target control amount, and a disturbance suppression parameter that determines a degree of suppression of influence of disturbance applied to the actuator, and wherein the supply power-calculating means sets the at least one of the follow-up parameter and the disturbance suppression parameter to a first predetermined value that causes the supply power to become smaller when the first determination means determines that the load parameter is not smaller than the first predetermined reference value, than when the first determination means determines that the load parameter is smaller than the first predetermined reference value.

With the configuration of this control system, the supply power-calculating means calculates the supply power to the actuator with a predetermined control algorithm such that the control amount follows up a target control amount; the load parameter-calculating means calculates a load parameter indicative of load on the actuator based on a power parameter indicative of electric power actually supplied to the actuator; and the first determination means determines whether or not the load parameter is not smaller than a first predetermined reference value. Further, the predetermined control algorithm includes at least one of a follow-up parameter that determines a follow-up property of the control amount to the target control amount, and a disturbance suppression parameter that determines a degree of suppression of influence of disturbance applied to the actuator, and the supply power-calculating means sets the at least one of the follow-up parameter and the disturbance suppression parameter to a first predetermined value that causes the supply power to become smaller when the first determination means determines that the load parameter is not smaller than the first predetermined reference value, than when the first determination means determines that the load parameter is smaller than the first predetermined reference value. Therefore, by properly setting the first predetermined reference value, when the actuator in a condition close to the overloaded state, the supply power to the actuator can be positively reduced. This makes it possible to avoid the actuator from entering the overloaded state. That is, differently from the prior art, it is possible to avoid the overloaded state of the actuator without using sensors or the like, whereby the manufacturing cost can be reduced. (Throughout the present specification, "detect" as in "detect the control amount" and "detect the value of electric current") is intended to mean not only to directly detect the amount and the value using respective sensors, but also to calculate them.)

Preferably, the power parameter is a value of electric current actually flowing through the actuator, and the load parameter-calculating means calculates the load parameter by multiplying the detected value of electric current by a time period over which the electric current has flowed.

With the configuration of this preferred embodiment, the load parameter is calculated by multiplying the detected value of electric current by a time period over which the electric current has flowed. Therefore, when determining whether or not the actuator is in a condition close to the overloaded state by comparing the load parameter with the first predetermined reference value, as described above, it is possible to easily and properly set the first predetermined reference value, compared with the conventional method of comparing a value calculated based on the square of the value of electric current with a reference value. This makes it possible to perform the determination more accurately, and more positively avoid the overloaded state of the actuator.

Preferably, the control system further comprises second determination means for determining whether or not the load parameter is not smaller than a second predetermined reference value which is larger than the first predetermined reference value, and the supply power-calculating means sets the supply power to a predetermined failure-time value when the second determination means determines that the load parameter is not smaller than the second predetermined reference value.

With the configuration of this preferred embodiment, when it is determined that the load parameter is not smaller than a second predetermined reference value which is larger than the first predetermined reference value, the supply power is set to a predetermined failure-time value. In this case, the second predetermined reference value is larger than the first predetermined reference value, and hence the load parameter has already been set to be not smaller than the first predetermined reference value before it becomes equal to or larger than the second predetermined reference value. Therefore, as described above, by the setting of the at least one of the parameters, the supply power is calculated as a value smaller than a value calculated when the load parameter is smaller than the first predetermined reference value. That is, in spite of the supply power being calculated as a value smaller than a value calculated when the load parameter is smaller than the first predetermined reference value, if the load parameter further increases to become not smaller than the second predetermined reference value, it can be concluded that the actuator is faulty. Therefore, by properly setting the predetermined failure-time value, it is possible to avoid the overloaded state of the actuator from continuing when the actuator is faulty.

More preferably, the control system further comprises storage means for storing respective results of determinations by the first determination means and the second determination means, and reset means for resetting the respective results of determinations by the first determination means and the second determination means, when a predetermined reset condition is satisfied.

With the configuration of this preferred embodiment, insofar as the predetermined reset condition is not satisfied, the respective results of determinations by the first and second determination means continue to be stored in the storage means, and hence e.g. during maintenance, it is possible to check whether the actuator is faulty or suffers from occurrence of the condition close to the overloaded state.

Preferably, the control system further comprises power parameter-determination means for determining whether or not the power parameter is not smaller than a predetermined threshold value, and in a case where the first determination means determines that the load parameter is not smaller than the first predetermined reference value, when the power parameter-determining means determines that the power parameter is smaller than the predetermined threshold value, the supply power-calculating means sets the at least one of the follow-up parameter and the disturbance suppression parameter to a second predetermined value that causes the supply power to become larger than when the at least one of the follow-up parameter and the disturbance suppression parameter is set to the first predetermined value.

With the configuration of this preferred embodiment, when the load parameter is not smaller than the first predetermined reference value, if the load parameter becomes smaller than a predetermined threshold value, the at least one of the parameters is set to a second predetermined value that causes the supply power to become larger than when the at least one of the follow-up parameter and the disturbance suppression parameter is set to the first predetermined value. In this case, as described above, when the load parameter is not smaller than the first predetermined reference value, i.e. the actuator is in a condition close to the overloaded state, the at least one of the parameters is set to the first predetermined value that causes the supply power to become smaller than when the load parameter is smaller than the first predetermined reference value, and hence the supply power to the actuator is in a reduces state. Accordingly, when the reduction of the supply power causes the power parameter to become smaller than the predetermined threshold value, the at least one of the parameters is set to the second predetermined value to thereby increase the supply power, whereby the actuator can be operated with an increased driving force. In short, as the condition of the actuator close to the overloaded state disappears, the driving force of the actuator can be automatically increased.

To attain the above object, in a second aspect of the present invention, there is provided a control system for controlling a control amount via an actuator that converts supply power into a driving force, comprising supply power-calculating means for calculating supply power to the actuator, current value-detecting means for detecting a value of electric current flowing through the actuator, load parameter-calculating means for calculating a load parameter indicative of load on the actuator by cumulative calculation of a product of the detected value of electric current and a time period over which the electric current has flowed, and determination means for determining whether or not the load parameter is not smaller than a predetermined reference value, wherein the supply power-calculating means sets the supply power to a predetermined failure-time value when the determination means determines that the load parameter is not smaller than the predetermined reference value.

With the configuration of this control system, the supply power-calculating means calculates supply power to the actuator; the load parameter-calculating means calculates a load parameter indicative of load on the actuator by multiplying a value of electric current and a time period over which the electric current has flowed; the determination means determines whether or not the load parameter is not smaller than a predetermined reference value; and the supply power-calculating means sets the supply power to a predetermined failure-time value when it is determined that the load parameter is not smaller than the predetermined reference value. Therefore, by properly setting the predetermined reference value and the predetermined failure-time value, it is possible to positively avoid the overloaded state of the actuator from continuing when the actuator is faulty. Further, since the load parameter is calculated by multiplying the value of electric and a time period over which the electric current has flowed, compared with the conventional method of comparing a value calculated based on the square of a value of electric current with a reference value, it is possible to easily and properly set the predetermined reference value for avoiding the overloaded state of the actuator, and as a consequence, it is possible to more positively avoid the overloaded state of the actuator from continuing.

Preferably, the control system further comprises storage means for storing a result of determination by the determination means, and reset means for resetting the result of determination by the determination means stored in the storage means, when a predetermined reset condition is satisfied.

According to this control system, insofar as the predetermined reset condition is not satisfied, the result of determination by the determination means continues to be stored in the storage means. Therefore, e.g. during maintenance, it is possible to check whether the actuator is faulty.

More preferably, the load parameter-calculating means carries out cumulative calculation of the load parameter when the value of electric current is not smaller than a predetermined current value, and resets the load parameter to a value of 0 when the value of electric current is smaller than the predetermined current value.

With the configuration of this preferred embodiment, cumulative calculation of the load parameter is carried out when the value of electric current is not smaller than a predetermined current value, and the load parameter is reset to a value of 0 when the value of electric current is smaller than the predetermined current value. Therefore, by properly setting the predetermined current value, the cumulative calculation of the load parameter is carried out only when the actuator continues to be in the overcurrent state or in a condition close thereto, and based on the thus calculated load parameter, it is possible to determine whether or not the actuator is in the overloaded state or in a condition close thereto. This makes it possible to carry out the determination promptly and accurately.

Preferably, the actuator is used in a variable valve lift mechanism that changes, as the control amount, a valve lift which is a lift of at least one of an intake valve and an exhaust valve of an internal combustion engine.

According to this control system, when the variable valve lift mechanism is used as the actuator, it is possible to obtain the advantageous effects described above.

Preferably the predetermined control algorithm includes a predetermined response-specifying control algorithm, and the disturbance suppression parameter is a response-specifying parameter in the predetermined response-specifying control algorithm, the response-specifying parameter designating convergence speed and convergence behavior of a difference between the control amount and the target control amount, the difference being converged to a value of 0.

With the configuration of this preferred embodiment, the supply power is calculated with the predetermined control algorithm including a predetermined response-specifying control algorithm, and the disturbance suppression parameter is a response-specifying parameter in the predetermined response-specifying control algorithm, which designates convergence speed and convergence behavior of a difference between the control amount and the target control amount, which is converged to a value of 0. In general, e.g. in an optimal regulator algorithm, and a PID control algorithm, when changing the convergence speed and the convergence behavior of the difference between the control amount and the target control amount which is converged to a value of 0, it is necessary to change the gains of a proportional term and an integral term to respective appropriate values. In this case, there is a fear that the balance of a combination of the gains is lost to make the control system unstable. In contrast, the response-specifying control algorithm has a feature that by changing the value of the response-specifying parameter, the convergence speed and convergence behavior of the difference between the control amount and the target control amount to a value of 0 can be changed without losing the balance of the combination of gains, whereby the degree of suppression of influence of disturbance on the actuator can be easily changed. Therefore, according to this control system, only by changing the value of the response-specifying parameter, the supply power to the actuator can be changed to a smaller value, whereby differently from the optimal regulator algorithm and the PID control algorithm, the overloaded state of the actuator can be avoided without losing the stability of the control system.

Preferably, the predetermined control algorithm includes a target value filter-type two-degree-of-freedom control algorithm as a combination of a predetermined target value filter algorithm that calculates a filtered value of the target control amount, and a predetermined feedback control algorithm for converging the control amount to the filtered value, and the follow-up parameter is a target value filter-setting parameter in the target value filter algorithm, for setting follow-up speed of the filtered value to the target control amount.

With the configuration of this preferred embodiment, the supply power is calculated with the predetermined control algorithm including a target value filter-type two-degree-of-freedom control algorithm as a combination of a predetermined target value filter algorithm that calculates a filtered value of the target control amount, and a predetermined feedback control algorithm for converging the control amount to the filtered value, and the follow-up parameter is a target value filter-setting parameter in the target value filter algorithm, for setting follow-up speed of the filtered value to the target control amount. In general, e.g. in the optimal regulator algorithm, and the PID control algorithm, when changing the follow-up speed of the control amount to the target control amount, it is necessary to change the gains of a proportional term and an integral term to respective appropriate values. In this case, there is a fear that the balance of a combination of the gains is lost to make the control system unstable. In contrast, the target value filter algorithm has a feature that by changing the value of the target value filter-setting parameter, the follow-up speed of the target control amount to the filtered value, i.e. the follow-up speed of the control amount to the target control amount can be changed without losing the balance of the combination of gains. Therefore, according to this control system, only by changing the value of the target value filter-setting parameter, the supply power to the actuator can be changed to a smaller value, whereby differently from the optimal regulator algorithm and the PID control algorithm, the overloaded state of the actuator can be avoided without losing the stability of the control system. More specifically, without degrading the controllability of the control amount with respect to the target control amount in a steady state, the load on the actuator is reduced only when the target control amount is changed, whereby the average load on the actuator can be reduced.

BEST MODE FOR CARRYING OUT THE INVENTION

Figure 2:
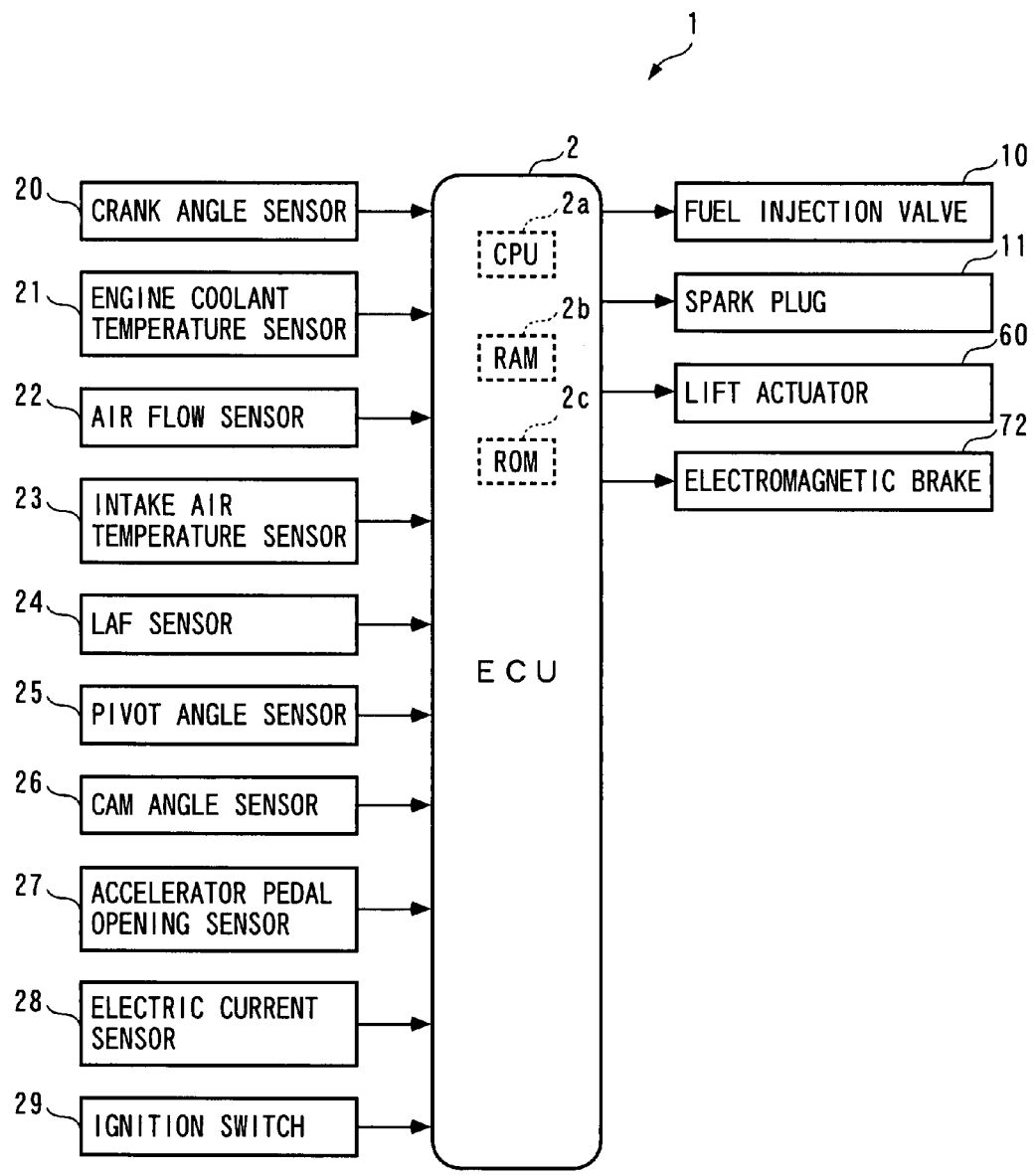
FIG. 2 is a schematic block diagram of the control system.

Hereafter, a control system for an internal combustion engine, according a first embodiment of the present invention will be described with reference to the drawings. The control system 1 includes an ECU 2, as shown in FIG. 2. As described hereinafter, the ECU 2 carries out processes for control, including variable mechanism control, fuel injection control, and ignition timing control, depending on operating conditions of the internal combustion engine (hereinafter simply referred to as "the engine") 3.

Figure 1:
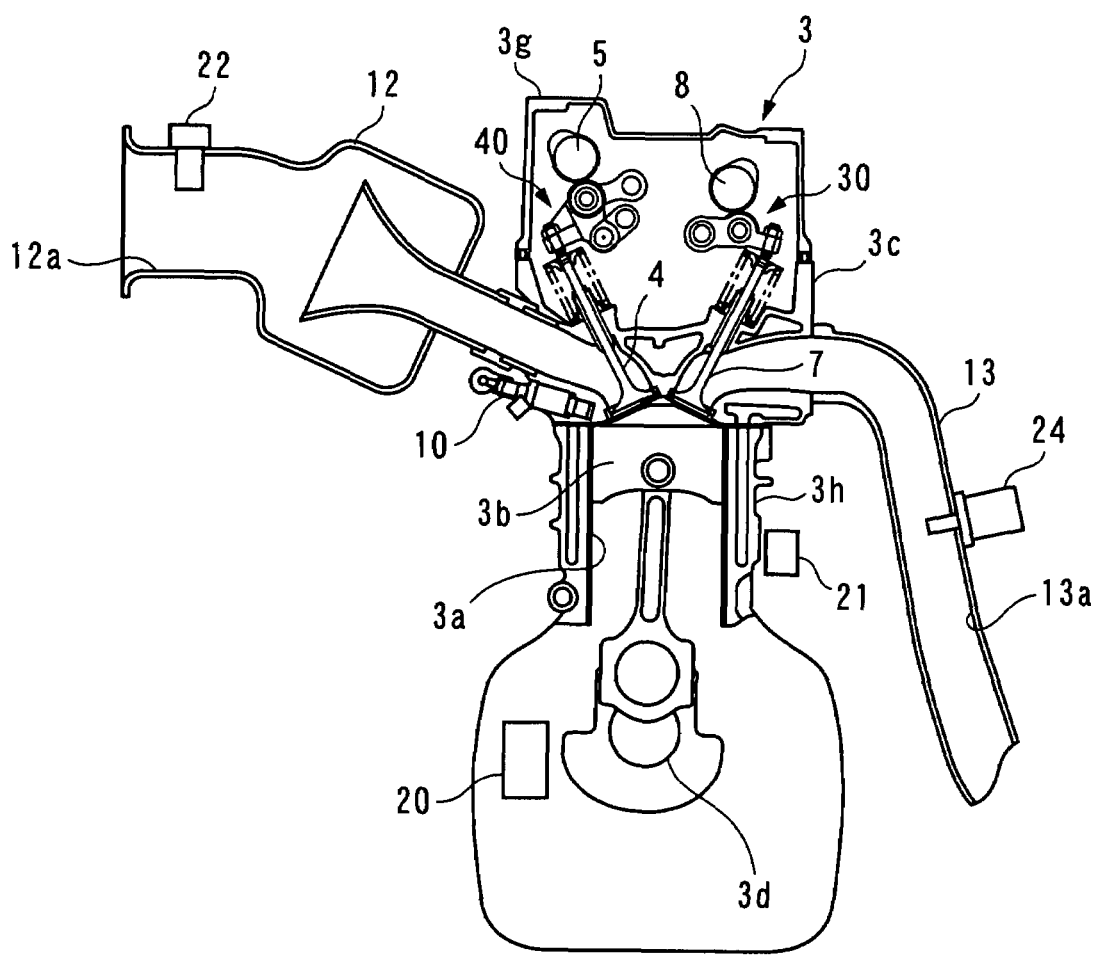
FIG. 1 is a diagram schematically showing the arrangement of an internal combustion engine to which is applied a control system according to an embodiment of the present invention.
Figure 3:
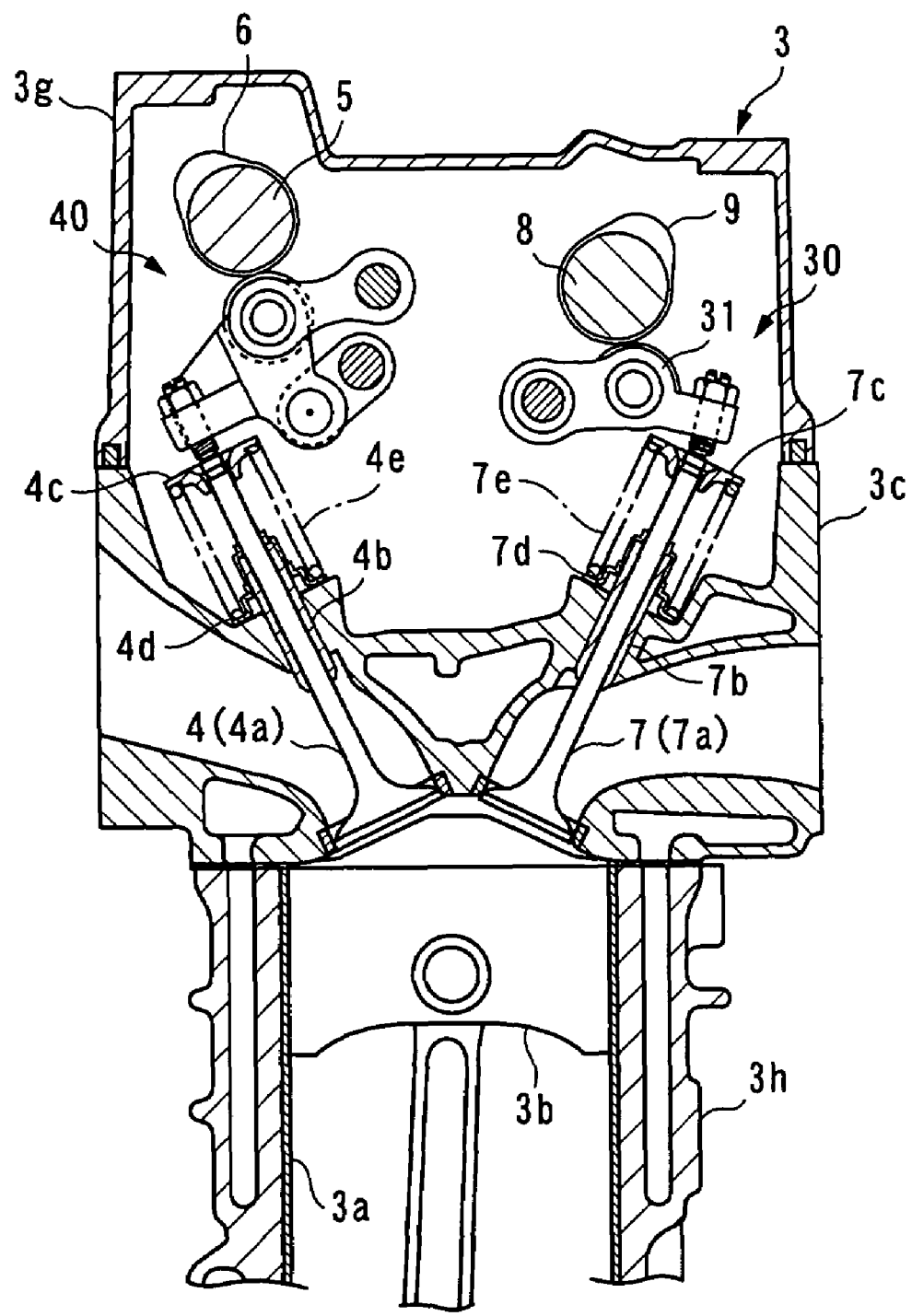
FIG. 3 is a schematic cross-sectional view of a variable intake valve-actuating mechanism and an exhaust valve-actuating mechanism of the engine.

Referring to FIGS. 1 and 3, the engine 3 is an in-line four-cylinder DOHC gasoline engine having a four pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 for actuating the intake valves 4, a variable intake valve-actuating mechanism 40 that actuates the intake valves 4 to open and close the same, an exhaust camshaft 8 and exhaust cams 9 for actuating the exhaust valves 7, an exhaust valve-actuating mechanism 30 that actuates the exhaust valves 7 to open and close the same, fuel injection valves 10, spark plugs 11 (see FIG. 2), and so forth.

Figure 4:
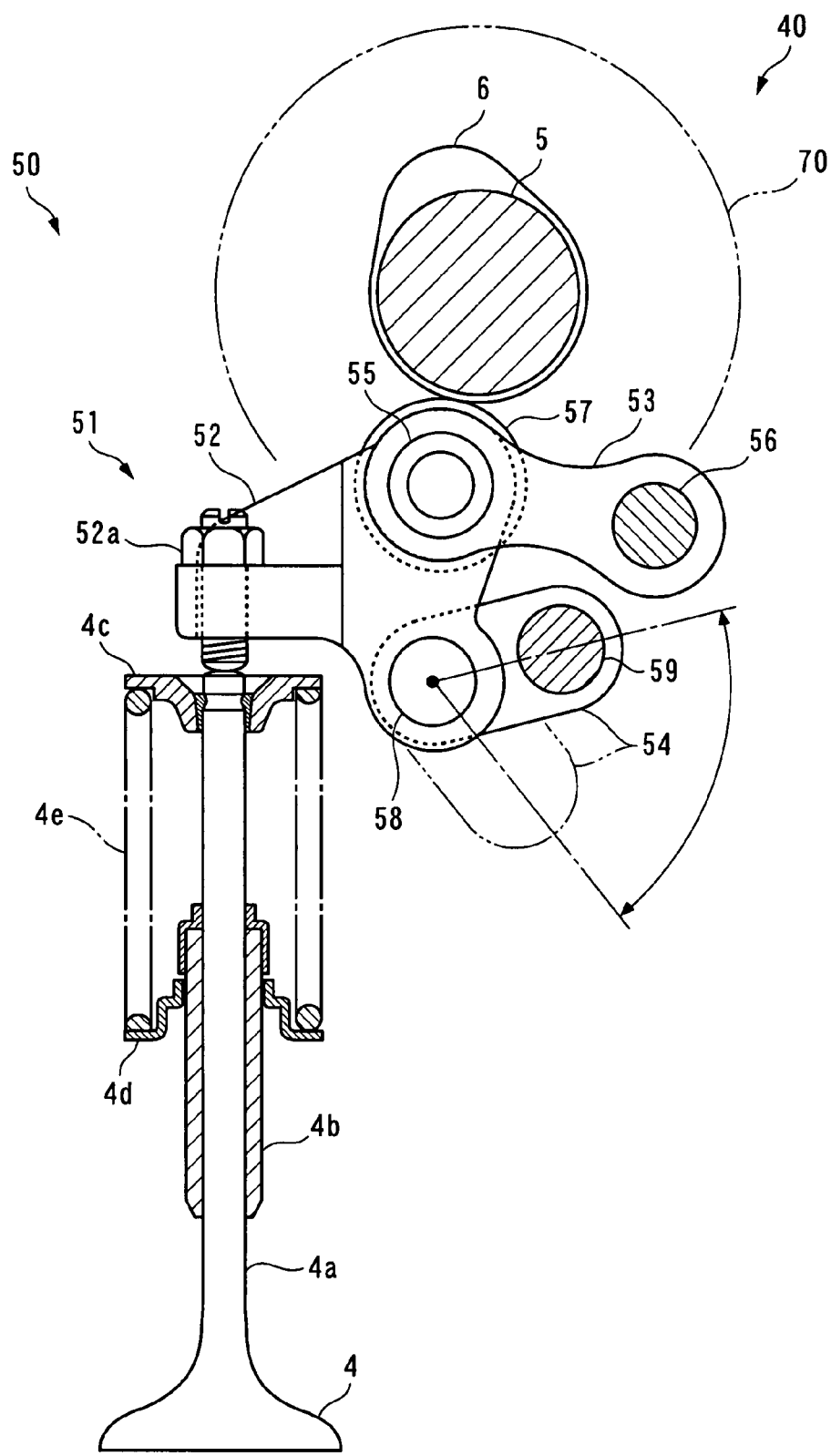
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Figure 8:
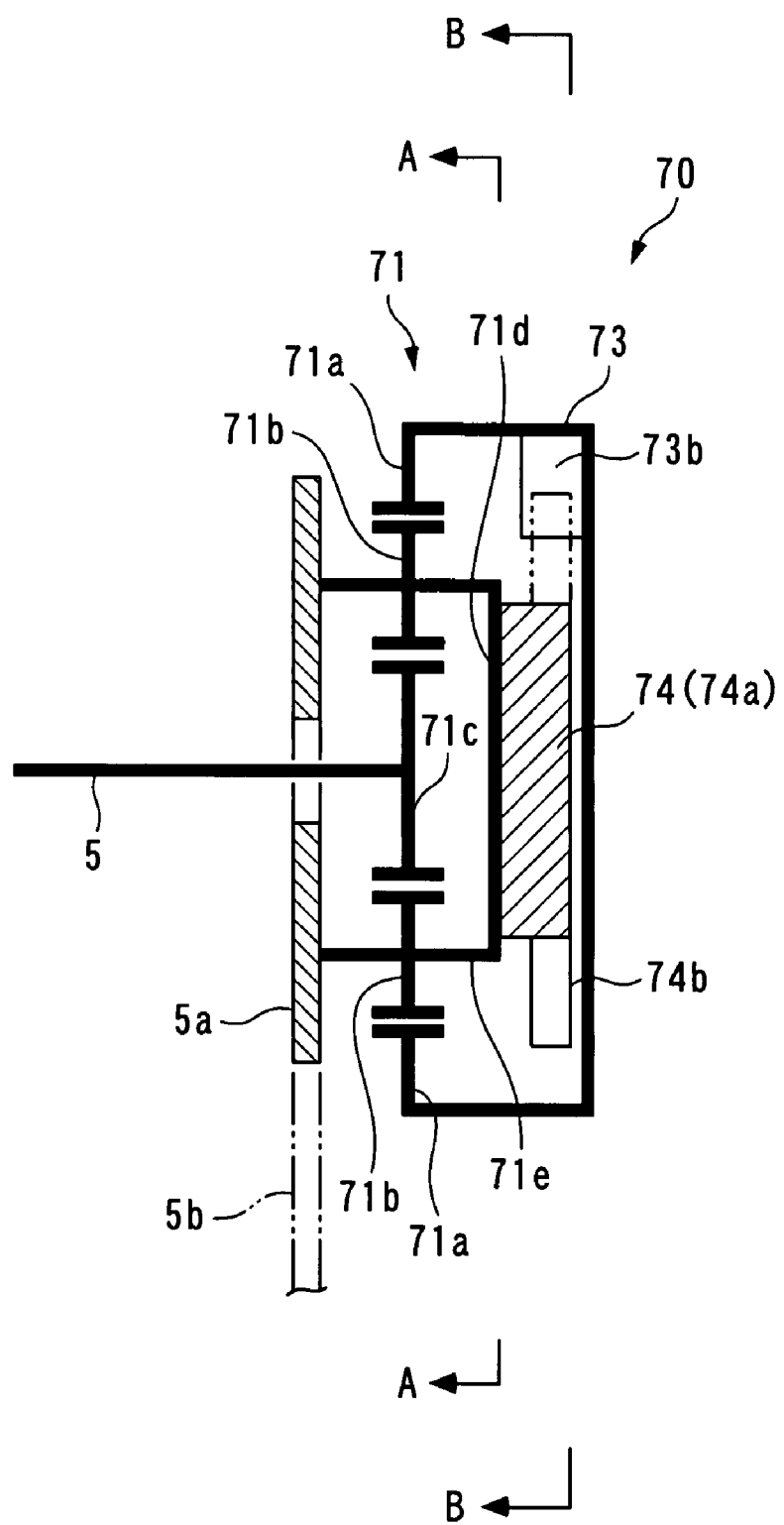
FIG. 8 is a schematic diagram of a variable cam phase mechanism.

Further, the intake camshaft 5 and the exhaust camshaft 8 are rotatably mounted through the cylinder head 3c via holders, not shown. The intake camshaft 5 has an intake 5a, as shown in FIG. 8, coaxially and rotatably fitted on one end thereof. The intake sprocket is connected to a crankshaft 3d via a timing belt 5b and connected to the intake camshaft 5 via a variable cam phase mechanism 70, described hereinafter. With the above configuration, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift") represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and the timing belt 5b, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a tilted state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection amount is controlled.

The spark plug 11 as well is provided for each cylinder 3a, and mounted through the cylinder head 3c. The spark plug 11 is electrically connected to the ECU 2, and a state of spark discharge is controlled by the ECU 2 such that a mixture in the combustion chamber is burned in timing corresponding to ignition timing, whereby fuel injection control is executed.

On the other hand, the engine 3 is provided with a crank angle sensor 20 and an engine coolant temperature sensor 21. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d. Each pulse of the CRK signal is generated whenever the crankshaft 3d rotates through a predetermined angle (e.g. 10°). The ECU 2 calculates the rotational speed NE of the engine 3 (hereinafter referred to as "the engine speed NE") based on the CRK signal. Further, the TDC signal indicates that each piston 3b in the associated cylinder 3a is in a predetermined crank angle position slightly before the TDC position at the start of the intake stroke, and each pulse of the TDC signal is generated whenever the crankshaft 3d rotates through a predetermined crank angle.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3.

Furthermore, the engine 3 has an intake pipe 12 from which a throttle valve mechanism is omitted, and an intake passage 12a which is formed to have a large diameter, whereby the engine 3 is configured such that flow resistance is smaller than in an ordinary engine. The intake pipe 12 is provided with an air flow sensor 22 and an intake air temperature sensor 23 (see FIG. 2).

The air flow sensor 22 is formed by a hot-wire air flow meter, and detects the flow rate Gin of air flowing through the intake passage 12a (hereinafter referred to as "the air flow rate Gin") to deliver a signal indicative of the sensed air flow rate Gin to the ECU 2. Further, the intake air temperature sensor 23 detects the temperature TA of the air flowing through the intake passage 12a (hereinafter referred to as "the intake air temperature TA"), and delivers a signal indicative of the sensed intake air temperature TA to the ECU 2.

Further, a LAF sensor 24 is inserted into an exhaust pipe 13 of the engine 3 at a location upstream of a catalytic converter, not shown. The LAF sensor 24 is comprised of a zirconia layer and platinum electrodes, and linearly detects the concentration of oxygen in exhaust gases flowing through an exhaust passage of the exhaust pipe 13, in a broad air-fuel ratio range from a rich region richer than the stoichiometric ratio to a very lean region, to deliver a signal indicative of the sensed oxygen concentration to the ECU 2. The ECU 2 calculates a detected air-fuel ratio KACT indicative of an air-fuel ratio in the exhaust gases, based on a value of the signal output from the LAF sensor 24. The detected air-fuel ratio KACT is expressed, specifically as an equivalent ratio.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70. In the present embodiment, the variable valve lift mechanism 50 corresponds to an actuator.

The variable valve lift mechanism 50 is provided for actuating the intake valves 4 to open and close the same, in accordance with rotation of the intake camshaft 5, and continuously changing the valve lift Liftin between a predetermined maximum value Liftin_H and a predetermined minimum value Liftin_L. The variable valve lift mechanism 50 is comprised of rocker arm mechanisms 51 of a four joint link type, provided for the respective cylinders 3a, and a lift actuator 60 (see FIGS. 5(a) and 5(b)) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5:
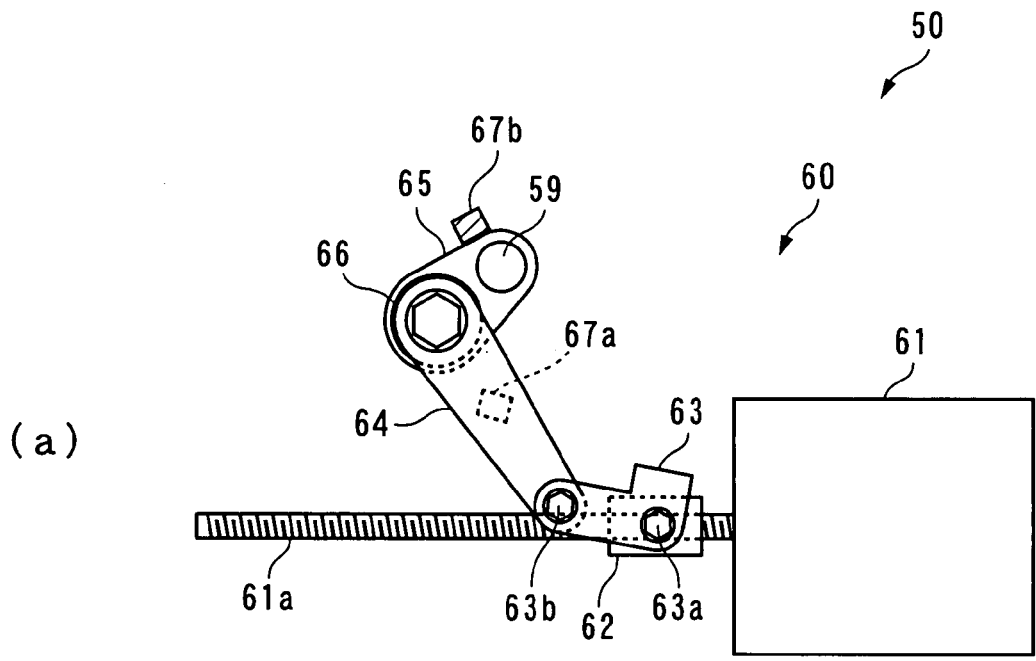
FIG. 5(a) is a diagram showing a lift actuator in a state in which a short arm thereof is in contact with a maximum lift stopper.
FIG. 5(b) is a diagram showing the lift actuator in a state in which the short arm thereof is in contact with a minimum lift stopper.
Figure 5:
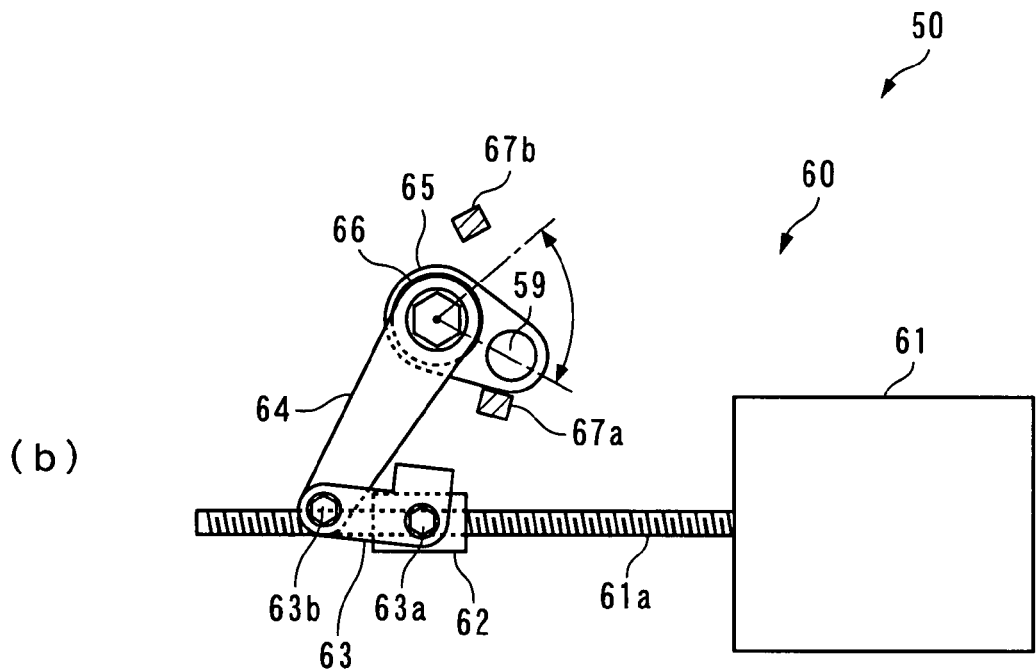

On the other hand, as shown in FIGS. 5(a) and 5(b), the lift actuator 60, which is driven by the ECU 2, is comprised of an electric motor 61, a nut 62, a link 63, a long arm 64, and the short arm 65. The electric motor 61 is connected to the ECU 2, and disposed outside a head cover 3g of the engine 3. The rotational shaft of the electric motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 extends through the other end of the short arm 65, whereby the short arm 65 is connected to the lower link 54 by the connection shaft 59. Further, in the vicinity of the short arum 65, a minimum lift stopper 67a and a maximum lift stopper 67b are arranged in a manner spaced from each other. These two stoppers 67a and 67b restrict the pivotal motion range of the short arm 65b as described hereinbelow.

Next, a description will be given of the operation of the variable valve lift mechanism 50 configured as above. In the variable valve lift mechanism 50, when a lift control input U_Liftin, described hereinafter, is input from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

As shown in FIG. 5(a), when the short arm 65 is pivotally moved counterclockwise as viewed in the figure, the short arm 65 is brought into abutment with the maximum lift stopper 67b and stopped thereat, whereby the lower link 54 is also stopped at the maximum lift position shown by a solid line in FIG. 4. On the other hand, as shown in FIG. 5(b), when the short arm 65 is pivotally moved clockwise, the short arm 65 is brought into abutment with the minimum lift stopper 67a and stopped thereat, whereby the lower link 54 is also stopped at the minimum lift position shown by a two-dot chain line in FIG. 4.

As described above, under the control of the ECU 2, the range of pivotal motion of the short arm 65 is restricted by the two stoppers 67a and 67b between the maximum lift position shown in FIG. 5(a) and the minimum lift position shown in FIG. 5(b), whereby the range of pivotal motion of the lower link 54 is also restricted between the maximum lift position indicated by the solid line in FIG. 4 and the minimum lift position indicated by the two-dot chain line in FIG. 4.

Figure 6:
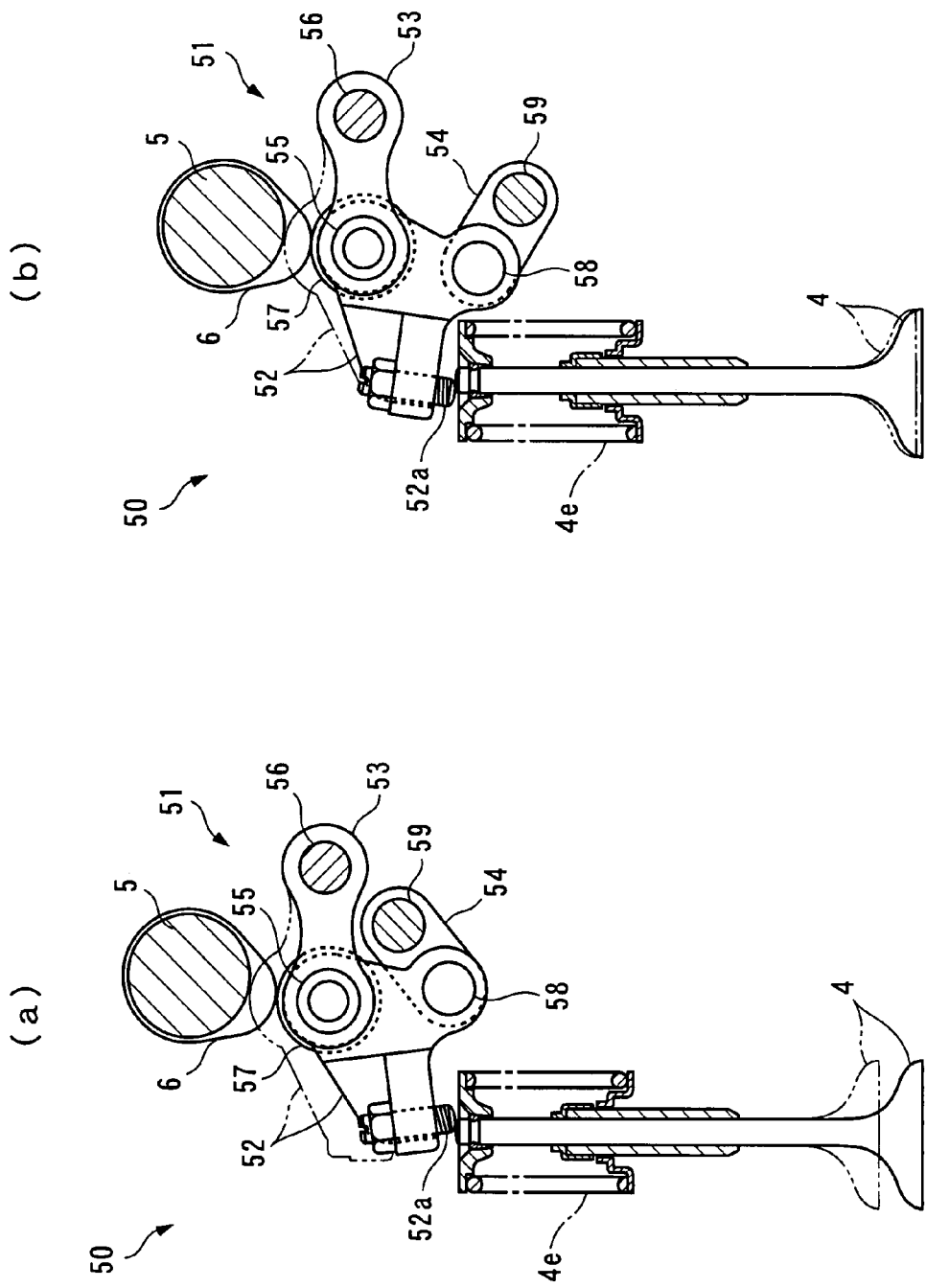
FIG. 6(a) is a diagram showing an intake valve placed in an open state when a lower link of the variable valve lift mechanism is in a maximum lift position.
FIG. 6(b) is a diagram showing the intake valve placed in an open state when the lower link of the variable valve lift mechanism is in a minimum lift position.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6(a), when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6(b), when the intake cam 6 rotates, the amount of movement of the adjusting bolt 52a becomes smaller than the amount of movement of the contact point where the intake cam 6 and the roller 57 are in contact with each other.

Figure 7:
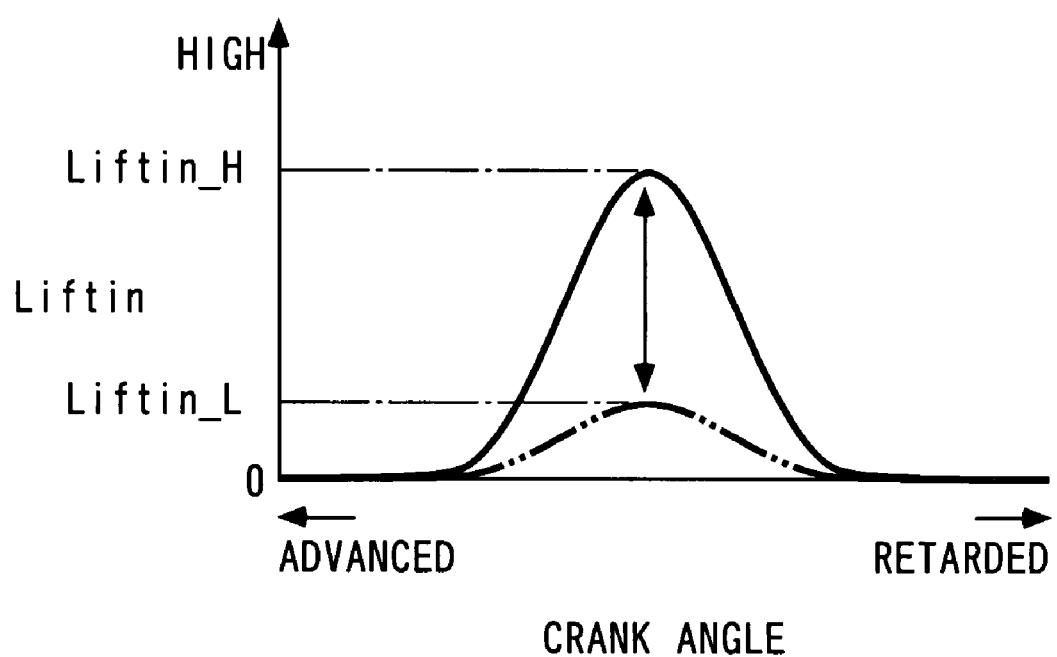
FIG. 7 is a diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftin_H. On the other hand, when the lower link 54 is in the minimum lift position, the intake valve 4 is opened according to a valve lift curve indicated by a two-dot chain line in FIG. 7, and the valve lift Liftin assumes its minimum value Liftin_L.

As described above, in the variable valve lift mechanism 50, the lower link 54 is pivotally moved by the lift actuator 60 between the maximum lift position and the minimum lift position, whereby it is possible to steplessly change the valve lift Liftin between the maximum value Liftin_H and the minimum value Liftin_L.

It should be noted that the variable valve lift mechanism 50 is provided with a lock mechanism, not shown, which locks operation of the variable valve lift mechanism 50 when the lift control input U_Liftin is set to a failure-time value U_Liftin_fs, referred to hereinafter, and when the lift control input U_Liftin is not input from the ECU 2 to the lift actuator 60 e.g. due to a disconnection. More specifically, the variable valve lift mechanism 50 is inhibited from changing the valve lift Liftin, whereby the valve lift Liftin is held at the minimum value Liftin_L. It should be noted that when a cam phase Cain is held at a most retarded value Cain_L, referred to hereinafter, the minimum value Liftin_L is set to such a value as will ensure a predetermined failure-time value of the intake air amount. The predetermined failure-time value is set to a value of the intake air amount which is capable of suitably carrying out idling or starting of the engine 3 during stoppage of the vehicle, and is at the same time capable of holding the vehicle in a state of low-speed traveling when the vehicle is traveling.

The engine 3 is provided with a pivot angle sensor 25 (see FIG. 2). The pivot angle sensor 25 delivers a signal indicative of a sensed pivot angle of the short arm 65 to the ECU 2. The ECU 2 calculates the valve lift Liftin based on the pivot angle of the short arm 65. In the present embodiment, the pivot angle sensor 25 corresponds to control amount-detecting means.

Figure 9:
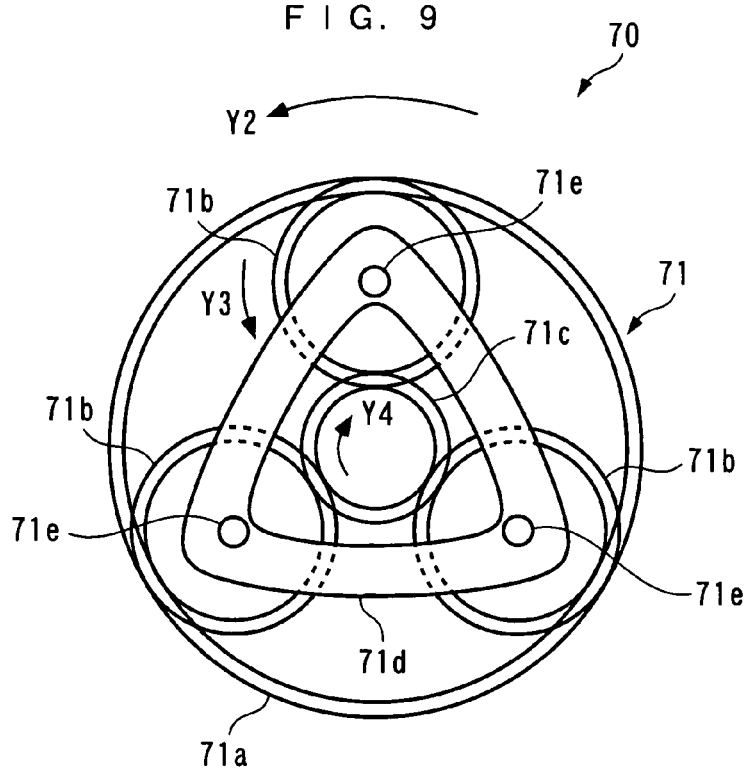
FIG. 9 is a schematic diagram of a planetary gear unit taken on line A-A of FIG. 8.
Figure 10:
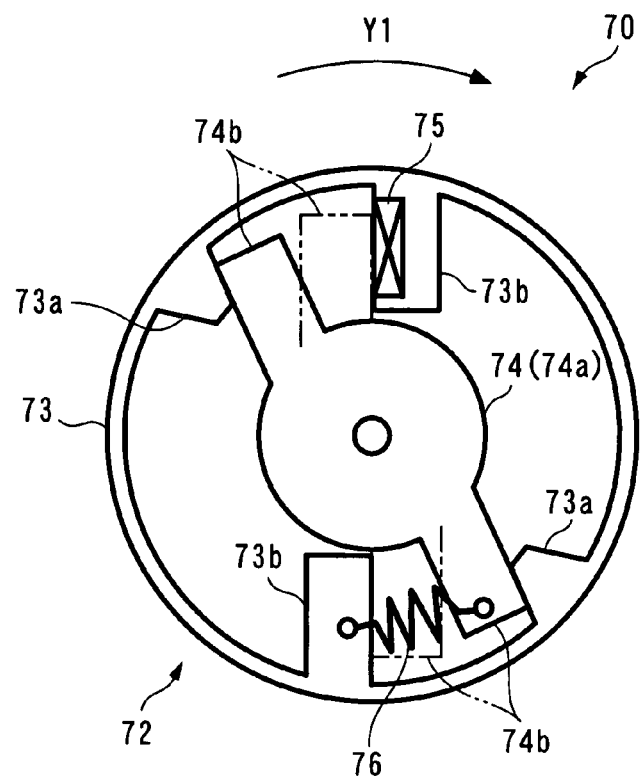
FIG. 10 is a schematic diagram of an electromagnet brake taken on line B-B of FIG. 8.

Next, a description will be given of the aforementioned variable cam phase mechanism 70. The variable cam phase mechanism 70 is of an electromagnetic type, as described hereinbelow, which steplessly changes the cam phase Cain by an electromagnetic force. As shown in FIGS. 8 to 10, the variable cam phase mechanism 70 includes a planetary gear unit 71 and an electromagnetic brake 72.

The planetary gear unit 71 transmits rotation between the intake camshaft 5 and the sprocket 5a, and is comprised of a ring gear 71a, three planetary pinion gears 71b, a sun gear 71c, and a planetary carrier 71d. The ring gear 71a is connected to an outer casing 73, referred to hereinafter, of the electromagnetic brake 72, and rotated coaxially in unison with the outer casing 73. Further, the sun gear 71c is coaxially attached to a foremost end of the intake camshaft 5 for rotation in unison therewith.

On the other hand, the planetary carrier 71d has a generally triangular shape, and includes shafts 71e protruding from the three corners thereof. The planetary carrier 71d is connected to the sprocket 5a via these shafts 71e, such that it rotates coaxially in unison with the sprocket 5a.

Further, each planetary pinion gear 71b is rotatably supported on an associated one of the shafts 71e of the planetary carrier 71d, and is disposed between the sung gear 71c and the ring gear 71a, in constant mesh with these gears.

Further, the electromagnetic brake 72, referred to hereinbefore, is driven by the ECU 2, and is comprised of an outer casing 73, a core 74, an electromagnet 75, and a return spring 76. The outer casing 73 is formed to be hollow, and the core 74 is disposed therein in a manner rotatable relative to the outer casing 73. The core 74 is comprised of a root portion 74a circular in cross-section, and two arms 74b and 74b extending radially from the root portion 74a. The core 74 has its root portion 74a mounted on the planetary carrier 71d for coaxial rotation in unison with the planetary carrier 71d.

On the other hand, on the inner peripheral surface of the outer casing 73, there are provided two pairs of stoppers 73a and 73b, at spaced intervals, each pair formed by a most retarded position stopper 73a and a most advanced position stopper 73b. The arms 74b of the core 74 are disposed between the respective pairs of stoppers 73a and 73b, whereby the core 74 is rotatable relative to the outer casing 73 between the most retarded position (indicated by solid lines in FIG. 10) in which the arms 74b are brought into contact with the most retarded position stoppers 73a and stopped thereat, and the most advanced position (indicated by two-dot chain lines in FIG. 10) in which the arms 74b are brought into contact with the most advanced position stoppers 73b and stopped thereat.

Further, the return spring 76 is interposed in a compressed state between one of the most advanced position stoppers 73b and the opposed one of the arms 74b, and the urging force Fspr of the return spring 76 urges the arms 74b toward the most retarded position stoppers 73a.

On the other hand, the electromagnet 75 is attached to one of the most advanced position stoppers 73b on a side opposite to the return spring 76, such that it is flush with an end of the most advanced position stopper 73b opposed to the arm 74b. The electromagnet 75 is electrically connected to the ECU 2, and when energized by a phase control input U_Cain (voltage signal) from the ECU 2, the electromagnetic force Fsol attracts the opposed one of the arms 74b against the urging force Fspr of the return spring 76 to pivotally move the same toward the most advanced position stopper 73b.

A description will be given of the operation of the variable cam phase mechanism 70 constructed as described above. In the variable cam phase mechanism 70, when the electromagnet 75 of the electromagnetic brake 72 is not energized, the core 74 is held by the urging force Fspr of the return spring 76 at the most retarded position in which the arm 74b abuts the most retarded position stopper 73a, whereby the cam phase Cain is held at the most retarded value Cain_L.

In this state, as the sprocket 5a rotates in a direction indicated by an arrow Y1 in FIG. 10 along with rotation of the crankshaft 3d of the engine in operation, the planetary carrier 71d and the ring gear 71a rotate in unison therewith, whereby the planetary pinion gears 71b are inhibited from rotation but the sun gear 71c rotates in unison with the planetary carrier 71d and the ring gear 71a. That is, the sprocket 5a and the intake camshaft 5 rotate in unison with each in the direction indicated by the arrow Y1.

Further, in a state in which the core 74 is held at the most retarded position, if the electromagnet 75 is energized by the phase control input U_Cain from the ECU 2, the electromagnetic force Fsol of the electromagnet 75 attracts the arm 74b of the core 74 toward the most advanced position stopper 73b, i.e. toward the most advanced position, against the urging force Fspr of the return spring 76, to be rotated to a position where the electromagnetic force Fsol and the urging force Fspr are balanced with each other. In other words, the outer casing 73 rotates relative to the core 74 in a direction opposite to the direction indicated by the arrow Y1.

This causes the ring gear 71a to rotate relative to the planetary carrier 71d in a direction indicated by an arrow Y2 in FIG. 9, and along therewith, the planetary pinion gears 71b rotate in a direction indicated by an arrow Y3 in FIG. 9, whereby the sun gear 71c rotates in a direction indicated by an arrow Y4 in FIG. 9. As a result, the intake camshaft 5 rotates relative to the sprocket 5a in the direction of the rotation of the sprocket 5a (i.e. a direction opposite to the direction indicated by the arrow Y2 in FIG. 9), whereby the cam phase Cain is advanced.

In this case, the pivotal motion of the outer casing 73 is transmitted to the intake camshaft 5 via the ring gear 71a, the planetary pinion gears 71b, and the sun gear 71c, and therefore the speed-increasing action of the planetary gear unit 70 causes the intake camshaft 5 to rotate relative to the sprocket 5a by an amplified or increased amount of angle of rotation of the outer casing 73. That is, the amount of advance of the cam phase Cain of the intake cam 5 is configured to be equal to an amplified value of angle of rotation of the outer casing 73. This is because the electromagnetic force Fsol of the electromagnet 75 has a limit beyond which it is not effective, and hence it is necessary to cause the cam phase Cain to vary through a wider range by compensating for the limit.

Figure 11:
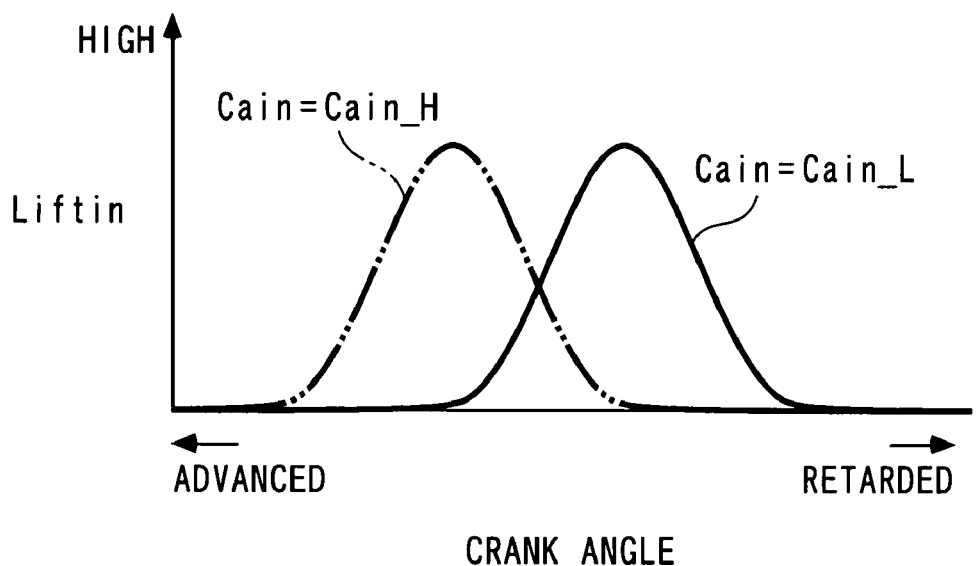
FIG. 11 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

As described above, the variable cam phase mechanism 70 is controlled by the phase control input U_Cain such that the cam phase Cain continuously changes between the most retarded value Cain_L (e.g. a value corresponding to a cam angle of 0°) and the most advanced value Cain_H (e.g. a value corresponding to a cam angle of 550°). As a result, as shown in FIG. 11, the valve timing of the intake valve 4 is steplessly changed between the most advanced timing shown by a solid line in FIG. 11 and the most retarded timing shown by a tow-dot chain line in FIG. 11.

It should be noted that in the variable cam phase mechanism 70, when the phase control input U_Cain is set to a failure-time value U_Cain fs, referred to hereinafter, and when the phase control input U_Cain is not inputted to the electromagnet 75 due to a disconnection, the cam phase Cain is held at the most retarded value Cain_L. As described hereinabove, the most retarded value Cain_L which is capable of ensuring the predetermined failure-time value of the intake air amount when the valve lift Liftin is held at the minimum value Liftin_L, as described above.

As described above, in the variable intake valve-actuating mechanism 40 used in the present embodiment, the valve lift Liftin is continuously changed by the variable valve lift mechanism 50 between the maximum value Liftin_H and the minimum value Liftin_L, and the cam phase Cain is continuously changed by the variable cam phase mechanism 70 between the most retarded value Cain_L and the most advanced value Cain_H, described hereinabove.

On the other hand, a cam angle sensor 26 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above.

Next, as shown in FIG. 2, connected to the ECU 2 are an accelerator pedal opening sensor 27, an electric current sensor 28, and an ignition switch (hereinafter referred to as "the IG•SW") 29. The accelerator pedal opening sensor 27 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2.

The electric current sensor 28 is implemented by a magnetic field sensor, and delivers a detection signal indicative of the value of electric current actually flowing through the electric motor 61 of the lift actuator 60 (hereinafter referred to as "the current value") Imot to the ECU 2. It should be noted that in the present embodiment, the electric current sensor 28 corresponds to power parameter-detecting means and current value-detecting means, and the current value Imot to a power parameter. Further, the IG•SW 29 is turned on or off by operation of an ignition key, not shown, and delivers a signal indicative of the ON/OFF state thereof to the ECU 2.

The ECU 2 is implemented by a microcomputer including a CPU 2a, a RAM 2b, a ROM 2c, and an I/O interface circuit, not shown, and the RAM 2b maintains data stored therein by a backup power supply even after the IG•SW 29 is turned off. The ECU 2 determines operating conditions of the engine 3, based on the detection signals delivered from the above-mentioned sensors 20 to 28, the output signal from the IG•SW 29, and the like, and executes control processes. More specifically, as will be described in detail hereinafter, the ECU 2 executes an overcurrent determining process, the variable mechanism control, the fuel injection control, and the ignition timing control according to the operating conditions of the engine 3.

It should be noted that in the present embodiment, the ECU 2 corresponds to control amount-detecting means, target control amount-setting means, supply power-calculating means, load parameter-calculating means, first determination means, second determination means, storage means, reset means, power parameter-determining means, and determination means, and the RAM 2b corresponds to the storage means.

Figure 12:
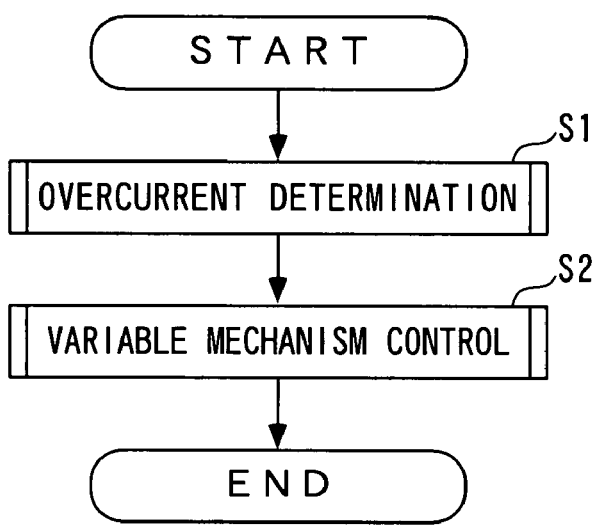
FIG. 12 is a flowchart showing a control process executed at a predetermined repetition period ΔT.

Hereinafter, a description will be given of control processes executed by the ECU 2. In the following description, the variable valve lift mechanism 50 and the variable cam phase mechanism 70 are collectively referred to as "the variable mechanism". FIG. 12 shows a control process executed at a predetermined repetition period ΔT (e.g. 5 msec) by timer setting.

In this process, first, in a step 1 (shown as S1 in abbreviated form in FIG. 12; the following steps are also shown in abbreviated form), an overcurrent determination process is executed for determining whether or not the electric motor 61 of the lift actuator 60 is in an overcurrent state, i.e. in an overloaded state, caused by the fixing or failure of a movable part of the variable valve lift mechanism 50. More specifically, as described hereinafter, a first overcurrent determination flag F_Imot_emg1, and a second overcurrent determination flag F_Imot_emg2 are set according to a current value Imot.

Then, in a step 2, the variable mechanism control is executed, followed by terminating the present process. In the variable mechanism control, as described hereinafter, the lift control input U_Liftin to the variable valve lift mechanism 50 and the phase control input U_Cain to the variable cam phase mechanism 70 are calculated.

Figure 13:
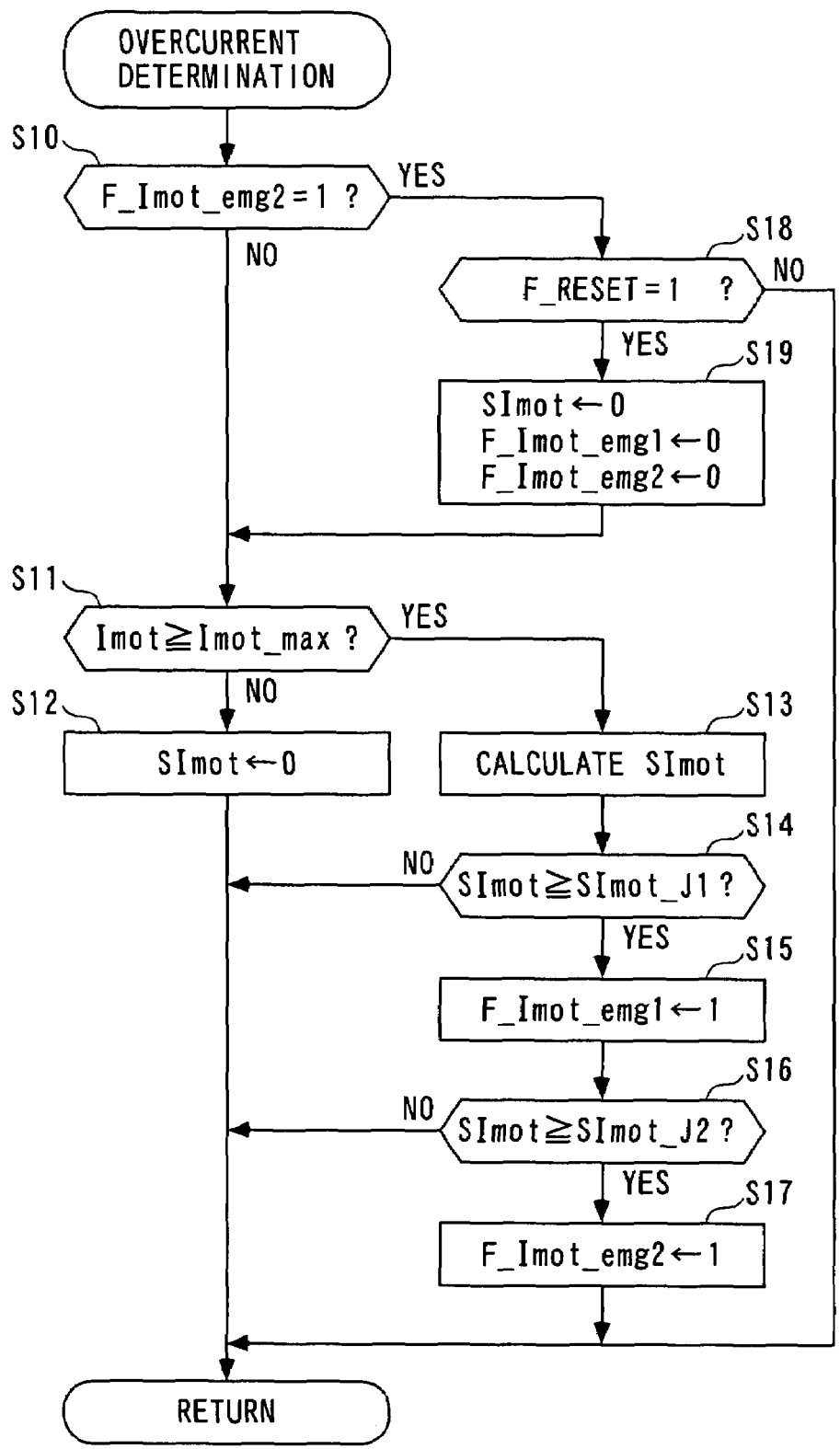
FIG. 13 is a flowchart showing an overcurrent determination process.

Next, a description will be given of the overcurrent determination process referred to hereinbefore, with reference to FIG. 13. In this process, first, in a step 10, it is determined whether or not the second overcurrent determination flag F_Imot_emg2 is equal to 1. If the answer to this question is negative (NO), the process proceeds to a step 11, wherein it is determined whether or not the current value Imot is not less than an upper limit value Imot_max. In the present embodiment, the upper limit value Imot_max corresponds to a predetermined threshold value and a predetermined current value.

If the answer to this question is negative (NO), i.e. if Imot<Imot_max holds, it is judged that the lift actuator 60 is not in the overcurrent and overloaded state, and the process proceeds to a step 12, wherein a cumulative value Simot is set to a value of 0, followed by terminating the present process.

On the other hand, if the answer to the question of the step S11 is affirmative (YES), i.e. Imot≧Imot_max holds, the process proceeds to a step 13, wherein the cumulative value Simot is calculated by the following equation (1), and stored in the RAM 2b. In the present embodiment, the cumulative value Simot corresponds to a load parameter.

$$SImot(k)=SImot(K-1)+Imot(k)\cdot Stime \quad (1)$$

In the equation (1), Stime represents a sampling period (time period over which electric current has flowed), which in the present case has a value equal to the control period ΔT. Each discrete data with a symbol (k) represents data sampled (or calculated) in synchronism with a predetermined control cycle. The symbol k represents a position in the sequence of sampling cycles of discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol k and the like provided for the discrete data are omitted as deemed appropriate.

As shown in the equation (1), the cumulative value SImot is calculated by cumulative calculation of the product of the current value Imot and the sampling period Stime. In this case, the current value Imot is in proportional relationship with the torque of the electric motor 61 of the lift actuator 60, i.e. load thereon, and hence the cumulative value Simot reflects the magnitude of load on the lift actuator 60 and its duration.

Next, in a step 14, it is determined whether or not the cumulative value SImot is not less than a first predetermined reference value Simot_J1. The first predetermined reference value Simot_J1 is a threshold value with reference to which it is determined whether or not the lift actuator 60 is in a condition close to the overcurrent and overloaded state. If the answer to this question is negative (NO), the present process is immediately terminated, whereas if the answer to the question is affirmative (YES), i.e. if Simot≧Simot_J1 holds, it is judged that the lift actuator 60 is in a condition close to the overcurrent and overloaded state, and the process proceeds to a step 15, wherein to indicate the above condition of the lift actuator 60, the first overcurrent determination flag F_Imot_emg1 is set to 1, and stored in the RAM 2b.

In a step following the step 15, it is determined whether or not the cumulative value Simot is not less than a second predetermined reference value Simot_J2. The second predetermined reference value Simot_J2 is a threshold value with reference to which it is determined whether or not the lift actuator 60 is in the overcurrent and overloaded state, i.e. whether or not the variable valve lift mechanism 50 is faulty, and is set to a value more than the first predetermined reference value Simot_J1.

If the answer to the question of the step 16 is negative (NO), the present process is immediately terminated, whereas if the answer to the question of the step 16 is affirmative (YES), i.e. if Simot≧Simot_J2 holds, it is judged that the lift actuator 60 is in the overcurrent and overloaded state, and the variable valve lift 50 is faulty, so that the process proceeds to a step 17, wherein to indicate the fact, the second overcurrent determination flag F_Imot_emg2 is set to a value of 1 and stored in the RAM 2b, followed by terminating the present process.

When the second overcurrent determination flag F_Imot_emg2 is set to 1, as described above, in loops following thereafter, the answer to the question of the step 10 becomes affirmative (YES), and hence the process proceeds to a step 18, wherein it is determined whether or not a reset flag F_RESET is equal to 1. The reset flag F_RESET is set to 1 when a predetermined reset condition is satisfied in a predetermined determination process, and otherwise, set to 0. More specifically, when a reset operation is executed by an external diagnosis apparatus or a battery canceling operation is executed, during maintenance, it is determined the predetermined reset condition is satisfied, so that the reset flag F_RESET is set to 1.

If the answer to the question of the step 18 is negative (NO), the present process is immediately terminated, whereas if the answer to the question of the step 18 is affirmative (YES), the process proceeds to a step 19, wherein the cumulative value Simot is set to a value of 0, and the two flags F_Imot_emg1 and F_Imot_emg2 are both reset to a value of 0. Then, as described hereinbefore, the step 11 et seq. are executed, followed by terminating the present process.

Figure 14:
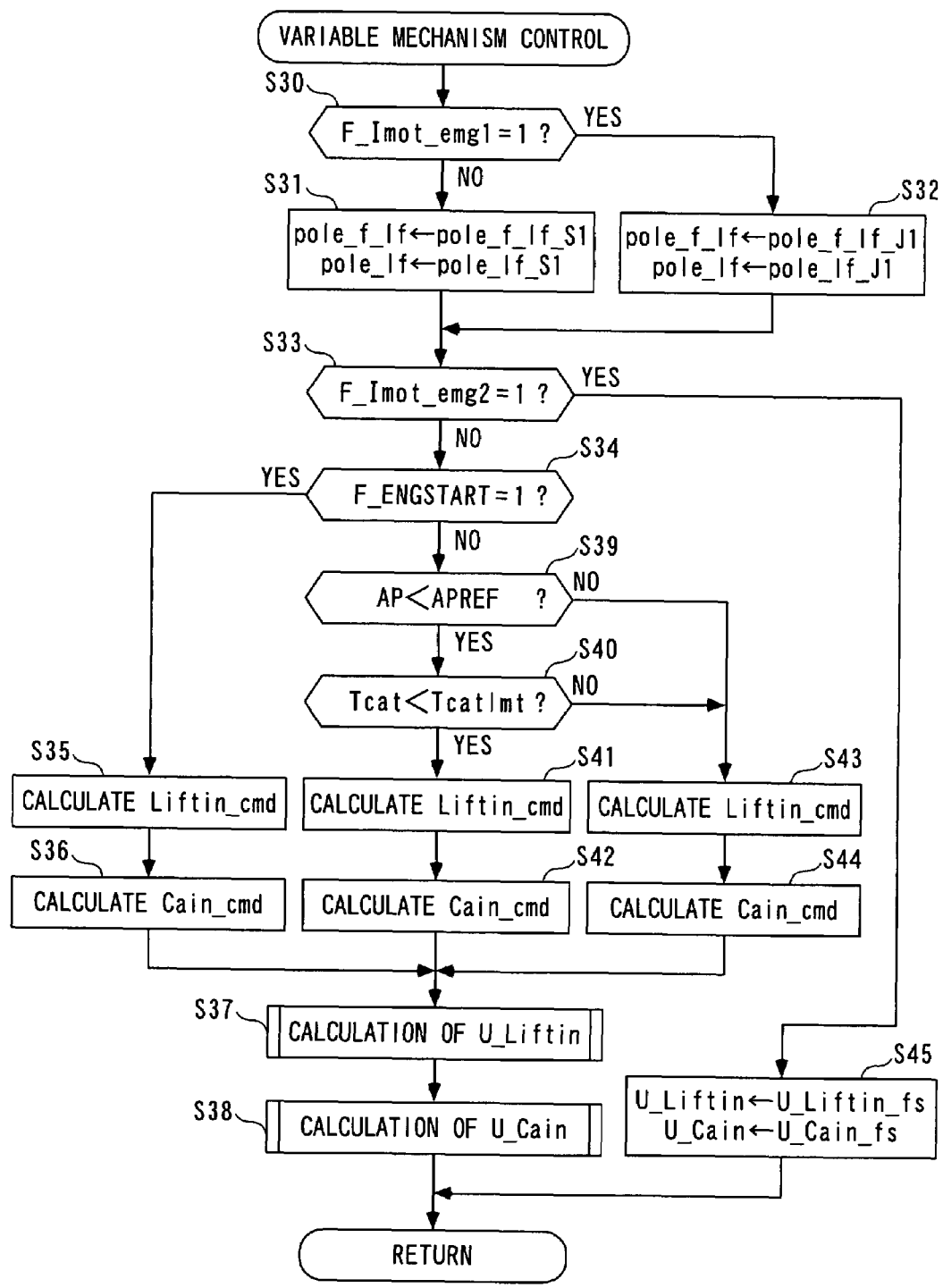
FIG. 14 is a flowchart showing a control process for controlling the movable mechanism.

Hereafter, a description will be given of the variable mechanism control process referred to hereinbefore, with reference to FIG. 14. First, in a step 30, it is determined whether or not the first overcurrent determination flag F_Imot_emg1 is equal to 1. IF the answer to this question is negative (NO), i.e. if the load on the lift actuator 60 is normal, the process proceeds to a step 31, wherein a target value filter-setting parameter pole_f_lf is set to a predetermined normal-time value pole_f_lf_S1, and a switching function-setting parameter pole_lf is set to a predetermined normal-time value pole_lf_S1.

These normal-time values pole_f_lf_S1 and pole_lf_S1 are set such that −1<pole_f_lf_S1<0, and −1<pole_lf_S1<0 hold. Further, the target value filter-setting parameter pole_f_lf and the switching function-setting parameter pole_f are used in the calculation of the lift control input U_Liftin, as will be described hereinafter.

On the other hand, if the answer to the question of the step S30 is affirmative (YES), i.e. if the lift actuator 60 is in the condition close to the overcurrent and overloaded state, the process proceeds to a step 32, wherein the target value filter-setting parameter pole_f_lf is set to a predetermined failure-time value pole_f_lf_J1, and the switching function-setting parameter pole_lf is set to a predetermined failure-time value pole_lf_J1. These failure-time values pole_f_lf_J1 and pole_lf_J1 are set for a reason described hereinafter such that that −1<pole_f_lf_J1<pole_f_lf_S1<0, and −1<pole_lf_J1<pole_lf_S1<0 hold.

In the present embodiment, the target value filter-setting parameter pole_f_if corresponds to a follow-up parameter, and the switching function-setting parameter pole_lf to a disturbance suppression parameter and a response-specifying parameter. Further, the failure-time values pole_f_lf_J1 and pole_lf_J1 correspond to a first predetermined value, and the normal-time values pole_f_lf_S1 and pole_lf_S1 to a second predetermined value.

In a step following the step 31 or 32, it is determined whether or not the second overcurrent determination flag F_Imot_emg2 is equal to 1. If the answer to this question is negative (NO), i.e. if the variable valve lift mechanism 50 is normal, the process proceeds to a step 34, wherein it is determined whether or not an engine start flag F_ENGSTART is equal to 1.

The engine start flag F_ENGSTART is set by determining, in a determination process, not shown, based on the engine speed NE and the output signal from the IG•SW 29 whether or not the engine is being subjected to starting control, i.e. being cranked. More specifically, when the engine is being subjected to starting control, the engine start flag F_ENGSTART is set to 1, and otherwise to 0.

Figure 15:
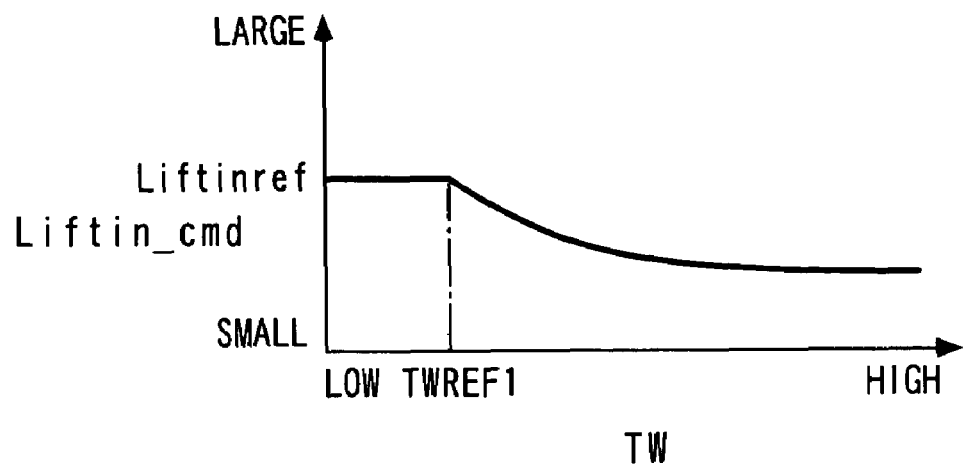
FIG. 15 is a diagram showing, by way of example, a table for use in calculating the target valve lift Liftin_cmd during starting of the engine.

If the answer to the question of the step 34 is affirmative (YES), i.e. if the engine starting control is being executed, the process proceeds to a step 35, wherein the target valve lift Liftin_cmd is calculated by searching a table shown in FIG. 15 according to the engine coolant temperature TW.

In this table, in a range where the engine coolant temperature TW is higher than a predetermined value TWREF1, the target valve lift Liftin_cmd is set to a larger value as the engine coolant temperature TW is lower, and in a range where TW≦TWREF1 holds, the target valve lift Liftin_cmd is set to a predetermined value Liftinref. This is to compensate for an increase in friction of the variable valve lift mechanism 50, which is caused when the engine coolant temperature TW is low.

Figure 16:
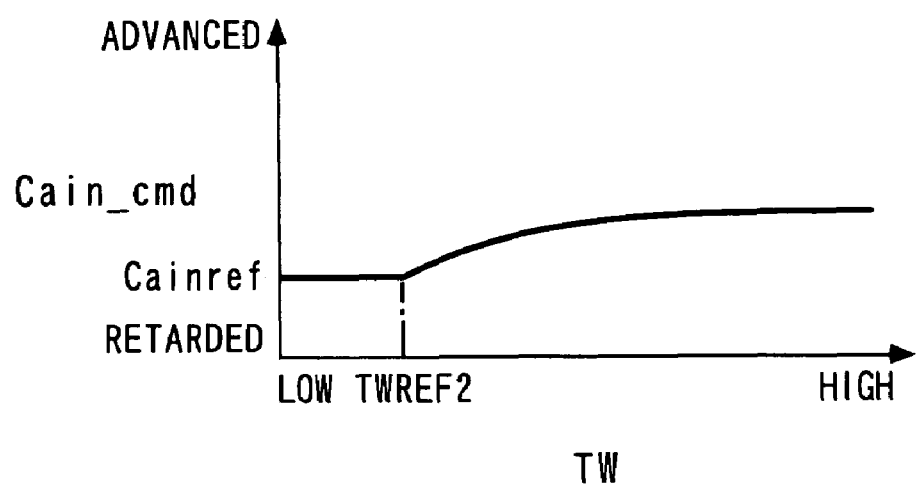
FIG. 16 is a diagram showing, by way of example, a table for use in calculating a target cam phase Cain_cmd during starting of the engine.

Then, in a step 36, the target cam phase Cain_cmd is calculated by searching a table shown in FIG. 16 according to the engine coolant temperature TW.

In this table, in a range where the engine coolant temperature TW is higher than a predetermined value TWREF2, the target cam phase Cain_cmd is set to a more retarded value as the engine coolant temperature TW is lower, and in a range where TW≦TWREF2 holds, the target cam phase Cain_cmd is set to a predetermined value Cainref. This is to ensure the combustion stability of the engine 3 by controlling the cam phase Cain to a more retarded value when the engine coolant temperature TW is low than when the engine coolant temperature TW is high, to thereby reduce the valve overlap, to increase the flow velocity of intake air.

Then, the process proceeds to a step 37, wherein the lift control input U_liftin is calculated with a target value filter-type two-degree-of-freedom sliding mode control algorithm expressed by the following equations (2) to (5), such that the valve lift Liftin follows up and converges to the target valve lift Liftin_cmd. In the present embodiment, the valve lift Liftin corresponds to a control amount, the target valve lift Liftin_cmd to a target control amount, and the lift control input U_Liftin to supply power.

$$U\_Liftin(k) = -Krch\_lf \cdot \sigma\_lf(k) - Kadp\_lf \cdot \sum_{i=0}^{k} \sigma\_lf(i) \quad (2)$$

$$\sigma\_lf(k) = E\_lf(k) + pole\_lf \cdot E\_lf(k-1) \quad (3)$$

$$E\_lf(k) = Liftin(k) - Liftin\_cmd\_f(k) \quad (4)$$

$$Liftin\_cmd\_f(k) = -pole\_f\_lf \cdot Liftin\_cmd\_f(k-1) + \quad (5)$$
$$(1 + pole\_f\_lf) \cdot Liftin\_cmd(k)$$

In the equation (2), Krch_lf represents a predetermined reaching law gain, and Kadp_lf represents a predetermined adaptive law gain. Further, σ_lf represents a switching function defined by the equation (3). In the equation (3), E_lf represents a follow-up error (difference) calculated by the equation (4). In the equation (4), Liftin_cmd_f represents a filtered value of the target valve lift, and is calculated with a target filter algorithm (first-order lag filter algorithm) expressed in an equation (5).

Then, the process proceeds to a step 38, wherein the phase control input U_Cain is calculated with a target value filter-type two-degree-of-freedom algorithm expressed by the following equations (6) to (9) such that the cam phase Cain follows up and converges to the target cam phase Cain_cmd.

$$U\_Cain(k) = -Krch\_ca \cdot \sigma\_ca(k) - \quad (6)$$
$$Kadp\_ca \cdot \sum_{i=0}^{k} \sigma\_ca(i)$$

$$\sigma\_ca(k) = E\_ca(k) + pole\_ca \cdot E\_ca(k-1) \quad (7)$$

$$E\_ca(k) = Cain(k) - Cain\_cmd\_f(k) \quad (8)$$

$$Cain\_cmd\_f(k) = -pole\_f\_ca \cdot Cain\_cmd\_f(k-1) + \quad (9)$$
$$(1 + pole\_f\_ca) \cdot Cain\_cmd(k)$$

In the equation (6), Krch_ca represents a predetermined reaching law gain, and Kadp_ca represents a predetermined adaptive law gain. Further, σ_ca represents a switching function defined by the equation (7). In the equation (7), E_ca represents a follow-up error calculated by the equation (8). In the equation (8), Cain_cmd_f represents a filtered value of the target cam phase, and is calculated with a target filter algorithm (first-order lag filter algorithm) expressed by the equation (9).

In the step 38, the phase control input U_Cain is calculated, as described above, followed by terminating the present process.

On the other hand, if the answer to the question of the step 34 is negative (NO), i.e. if the engine starting control is not being executed, the process proceeds to a step 39, wherein it is determined whether or not the accelerator pedal opening AP is smaller than a predetermined value APREF. The predetermined value APREF is for determining that the accelerator pedal is not stepped on, and set to a value (e.g. 1°) capable of determining that the accelerator pedal is not stepped on.

If the answer to the question of the step 39 is affirmative (YES), i.e. if the accelerator pedal is not stepped on, the process proceeds to a step 40, wherein it is determined whether or not the timer count value Tcat of a catalyst warmup timer is smaller than a predetermined value Tcatlmt (e.g. 30 sec). The catalyst warmup timer is for measuring a time period over which the catalyst warmup control has been executed, and formed by an upcount timer. The catalyst warmup control is executed for rapidly activating catalyst in the catalytic converter arranged in the exhaust pipe 13 after the start of the engine 3.

Figure 17:
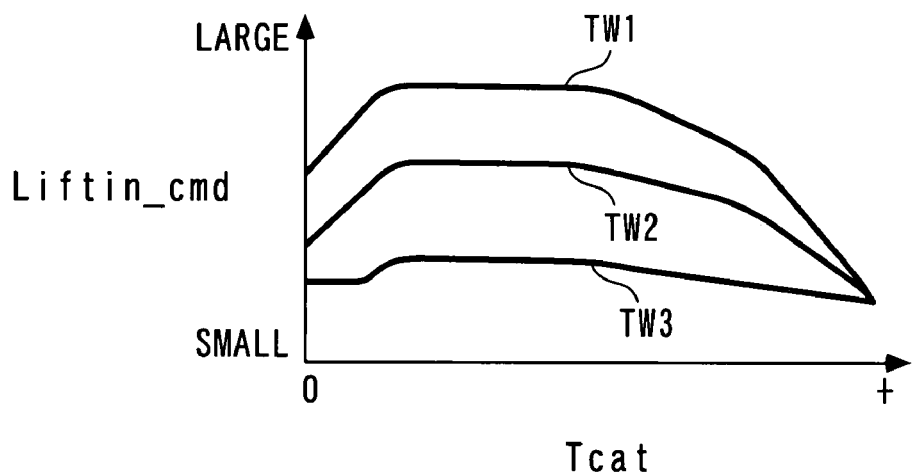
FIG. 17 is a diagram showing, by way of example, a map for use in calculating a target valve lift Liftin_cmd during catalyst warmup control.

If the answer to this question of the step 40 is affirmative (YES), i.e. if Tcat<Tcatlmt holds, it is judged that the catalyst warmup control should be executed, and the process proceeds to a step 41, wherein the target valve lift Liftin_cmd is calculated by searching a map shown in FIG. 17 according to the timer value Tcat of the catalyst warmup timer and the engine coolant temperature TW. In FIG. 17, TW1 to TW3 indicate predetermined values of the engine coolant temperature TW, between which the relationship of TWL<TW2<TW3 holds. This also applies to the following description.

In this map, the target valve lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, in a region where the timer value Tcat of the catalyst warmup timer is small, the target valve lift Liftin_cmd is set to a larger value as the time value Tcat is larger, whereas in a region where the timer value Tcat of the catalyst warmup timer is large, the target valve lift Liftin_cmd is set to a smaller value as the time value Tcat is larger. This is because the warming up of the engine 3 proceeds along with the lapse of time during which the catalyst warmup control is executed, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Figure 18:
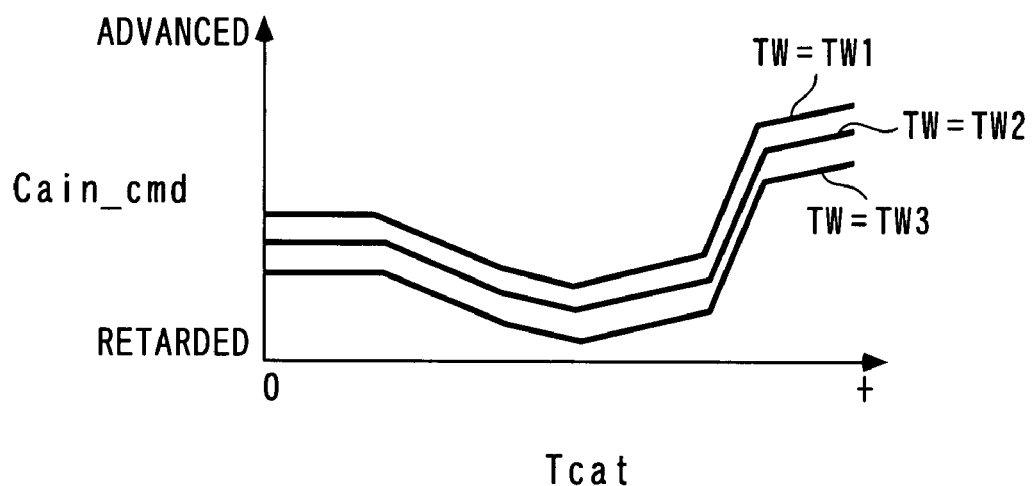
FIG. 18 is a diagram showing, by way of example, a map for use in calculating the target cam phase Cain_cmd during the catalyst warmup control.

Then, in a step 42, the target cam phase Cain_cmd is calculated by searching a map shown in FIG. 18 according to the timer value Tcat of the catalyst warmup timer and the engine coolant temperature TW.

In this map, the target cam phase Cain_cmd is set to a more advanced value as the engine coolant temperature TW is lower. This is because as the engine coolant temperature TW is lower, it takes a longer time period to activate the catalyst, as described above, and hence the pumping loss is reduced to increase the intake air amount to thereby shorten the time period required for activating the catalyst. Furthermore, in the above map, in a region where the timer value Tcat of the catalyst warmup timer is small, the target cam phase Cain_cmd is set to a more retarded value as the timer value Tcat is larger, whereas in a region where the timer value Tcat is large, the target cam phase Cain_cmd is set to a more advanced value as the timer value Tcat is larger. The reason for this is the same as given in the description of the FIG. 17 map.

Following the step 42, the steps 37 and 38 are carried out, as described hereinabove, followed by terminating the present process.

Figure 19:
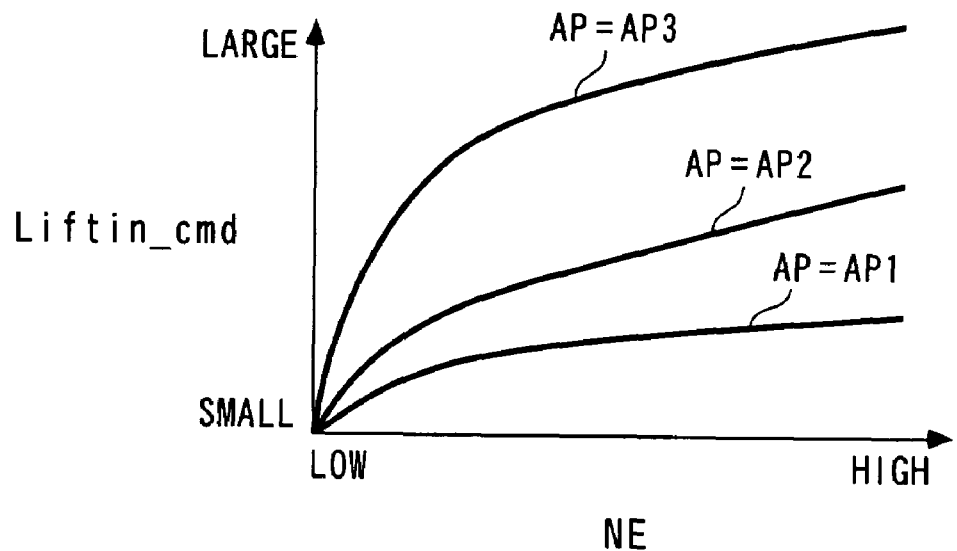
FIG. 19 is a diagram showing, by way of example, a map for use in calculating the target valve lift Liftin_cmd during the normal operation of a vehicle.

On the other hand, if the answer to the question of the step 39 or the step 40 is negative (NO), i.e. if the accelerator pedal is stepped on, or if the Tcat≧Tcatlmt holds, the process proceeds to a step 43, wherein the target valve lift Liftin_cmd is calculated by searching a map shown in FIG. 19 according to the engine speed NE and the accelerator pedal opening AP. In FIG. 19, AP1 to AP3 indicate predetermined values of the accelerator pedal opening AP, between which the relationship of AP1<AP2<AP3 holds. This also applies to the following description.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 20:
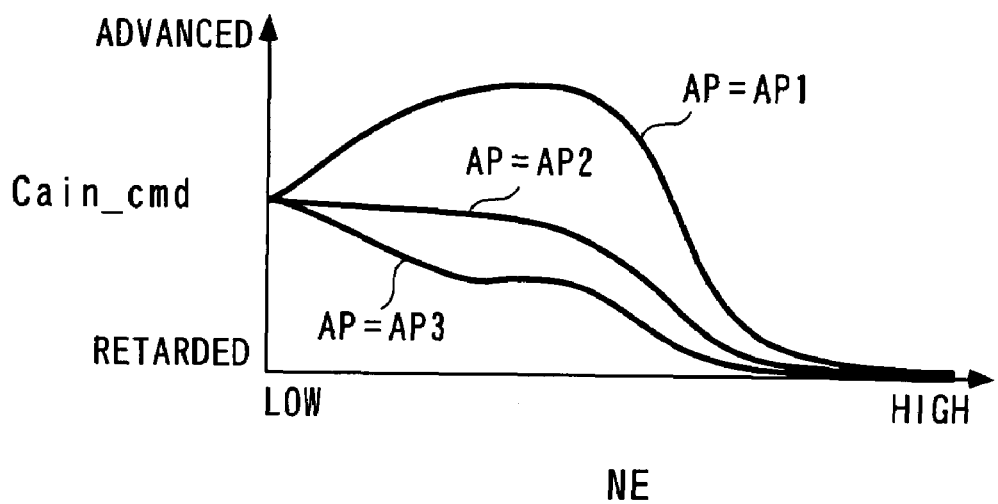
FIG. 20 is a diagram showing, by way of example, a map for use in calculating the target cam phase Cain_cmd during the normal operation of the vehicle.

Then, in a step 44, the target cam phase Cain_cmd is calculated by searching a map shown in FIG. 20 according to the engine speed NE and the accelerator pedal opening AP. In this map, when the accelerator pedal opening AP is small and the engine speed NE is in the medium rotational speed region, the target cam phase Cain_cmd is set to a more advanced value than otherwise. This is because under the above operating conditions of the engine 3, it is necessary to increase an overlap to reduce the pumping loss.

Following the step 44, the steps 37 and 38 are carried out, as described hereinabove, followed by terminating the present process.

On the other hand, if the answer to the question of the step 33 is affirmative (YES), i.e. if the variable valve lift mechanism 50 is faulty, the process proceeds to a step 45, wherein the lift control input U_Liftin is set to the predetermined failure-time value U_Liftin_fs; the phase control input U_Cain to the predetermined failure-time value U_Cain_fs, followed by terminating the present process. As a result, as described above, the valve lift Liftin is held at the minimum value Liftin_L, and the cam phase Cain at the most retarded value Cain_L, whereby it is possible to suitably carry out idling or starting of the engine 3 during stoppage of the vehicle, and at the same time hold the vehicle in the state of low-speed traveling when the vehicle is traveling.

As described above, in the variable mechanism control process, the lift control input U_Liftin is calculated with the target value filter-type two-degree-of-freedom sliding mode control algorithm expressed by the equations (2) to (5), and this control algorithm has features described below.

First, the control algorithm has a feature that a follow-up speed of the filtered value Liftin_cmd_f of the target valve lift to the target valve lift Liftin_cmd can be changed by changing the value of the target value filter-setting parameter pole_f_lf in the equation (5). More specifically, as the target value filter-setting parameter pole_f_lf is set to a value closer to a value of −1, the follow-up speed of the filtered value Liftin_cmd_f of the target valve lift to the target valve lift Liftin_cmd is set to a lower value. This causes the lift control input U_Liftin for causing the valve lift Liftin to converge to the target valve lift Liftin to be calculated as a smaller value, whereby the current value Imot is set to a smaller value.

Therefore, as described hereinabove, if the answer to the question of the step 30 is affirmative (YES), i.e. if the lift actuator 60 is in a condition close to the overcurrent and overloaded state, the target value filter-setting parameter pole_f_lf is changed from the predetermined normal-time value pole_f_lf_S1 to the failure-time value pole_f_lf_J1, which is closer to a value of −1 than the predetermined normal-time value pole_f_lf_S1, whereby the lift control input U_Liftin i.e. the current value Imot (particularly the maximum value of the current value Imot) is set to a smaller value than when the normal-time value pole_f_lf_S1 is used. This causes the lift actuator 60 to be operated with lower load, so as to avoid the condition close to the overcurrent and overloaded state thereof.

Further, the control algorithm has a feature that the convergence speed and convergence behavior of the follow-up error E_lf to a value of 0 can be changed by changing the value of the switching function-setting parameter pole_lf in the equation (3). In other words, it has a feature that the degree of suppression of disturbance applied to the variable valve lift mechanism 50, i.e. the lift actuator 60 can be changed. More specifically, as the switching function-setting parameter pole_lf is set to a value closer to a value of −1, the degree of suppression of the disturbance is reduced, to thereby permit generation of a larger follow-up error E_lf. This causes the lift control input U_Liftin upon generation of the follow-up error E_lf to be calculated as a smaller value, whereby the current value Imot is set to a smaller value. More specifically, the maximum value of the current value Imot upon generation of the follow-up error E_lf can be reduced.

Therefore, as described above, if the answer to the question of the step 30 is affirmative (YES), i.e. if the lift actuator 60 is in the condition close to the overcurrent and overloaded state, the switching function-setting parameter pole_lf is changed from the predetermined normal-time value pole_lf_S1 to the failure-time value pole_lf_J1, whereby the lift control input U_Liftin i.e. the current vale Imot is set to a smaller value. This causes the lift actuator 60 to be operated with lower load so as to avoid the condition close to the overcurrent and overloaded state of the lift actuator 60. For the reasons described above, if the answer to the question of the step 30 is affirmative (YES), in the step 32, the two parameters pole_f_lf and pole_lf are set to the respective failure-time values pole_f_lf_J1 and pole_lf_J1 which are closer to a value of −1 than the normal-time values pole_f_lf_S1 and pole_lf_S1.

It should be noted that the variable mechanism control process described heretofore may be configured such that when the answer to the question of the step 33 is affirmative (YES), instead of executing the step 45, a step may executed in which the target valve lift Liftin_cmd and the target cam phase Cain_cmd are set to respective predetermined failure-time values, and then the steps 37 and 38 may be executed to thereby calculate the lift control input U_Liftin and the phase control input U_Cain for use during the failure-time of the variable valve lift mechanism 50.

Figure 21:
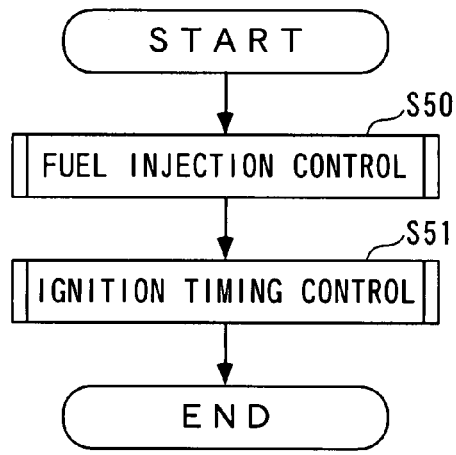
FIG. 21 is a flowchart showing a control process executed in synchronism with generation of the TDC signal.

Next, a description will be given of a control process executed in synchronism with generation of the TDC signal, with reference to FIG. 21. As shown in FIG. 21, in this process, first, in a step 50, the fuel injection control process is executed, in which the fuel injection amount Tcyl is calculated for the fuel injection valves 10, on a valve-by-valve basis, depending on the operating conditions of the engine 3, as will be described hereinafter.

Next, in a step 51, the ignition timing control process is executed in which ignition timing Iglog is calculated for the spark plugs 11, on a plug-by-plug basis, depending on the operating conditions of the engine 3, as will be described hereinafter, followed by terminating the present process.

Figure 22:
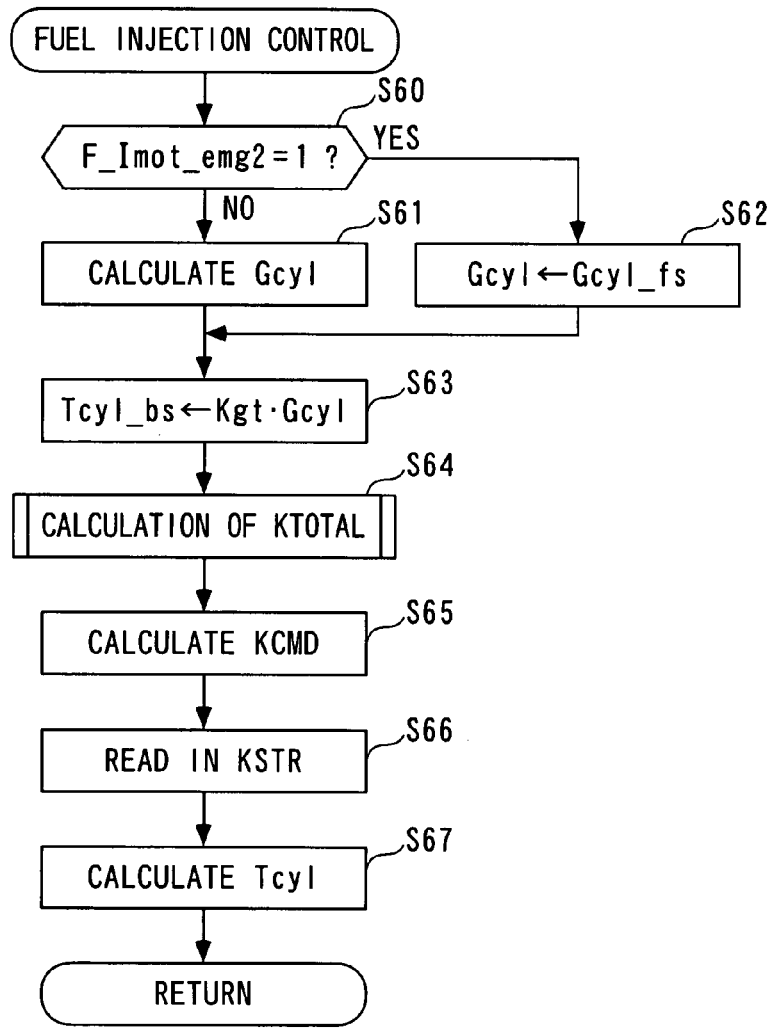
FIG. 22 is a flowchart showing a fuel injection control process.

Next, a description will be given of the fuel injection control process referred to hereinabove, with reference to FIG. 22. In this process, first, in a step 60, the second overcurrent determination flag F_Imot_emg2 is equal to 1. If the answer to this question is negative (NO), i.e. if the variable valve lift mechanism 50 is normal, in a step 61, the intake air amount Gcyl is calculated by the following equation (10):

$$Gcyl = \frac{60 \cdot Gin}{2 \cdot NE} \qquad (10)$$

On the other hand, if the answer to the question of the step 60 is affirmative (YES), i.e. if the variable valve lift mechanism 50 is faulty, the process proceeds to a step 62, wherein the intake air amount Gcyl is set to a predetermined failure-time value Gcyl_fs.

In a step 63 following the step 61 or the step 62, the basic fuel injection amount Tcyl_bs is set to the product Kgt·Gcyl of a conversion coefficient Kgt and the intake air amount Gcyl. The conversion coefficient Kgt is a predetermined value set to the fuel injection valves 10, in advance, on a valve-by-valve basis.

Then, the process proceeds to a step 64, wherein a total correction coefficient KTOTAL is calculated. More specifically, various correction coefficients are calculated by searching respective various tables and maps according to various operating parameters (e.g. intake air temperature TA, atmospheric pressure PA, engine temperature TW, accelerator opening AP, and so forth), and these various correction coefficients are multiplied with each other to thereby calculate the total correction coefficient KTOTAL.

Next, in a step 65, a map, not shown, is searched according to the accelerator pedal opening AP and the intake air amount Gcyl, to thereby calculate a target air-fuel ration KCMD. The target air-fuel ratio KCMD is basically set to a stoichiometric value (14.5) so as to maintain excellent emission-reducing performance of the catalytic converter.

Next, the process proceeds to a step 66, wherein an air-fuel ratio correction coefficient KSTR stored in the RAM 2b is read in. The air-fuel ratio correction coefficient KSTR is calculated in a calculation process, not shown, with control algorithms including a predetermined feedback control algorithm according to the target air-fuel ratio KCMD and the detected air-fuel ratio KACT.

Next, in a step 67, the fuel injection amount Tcyl is calculated by the following equation (11), followed by terminating the present process.

$$\text{Tcyl} = \text{Tcyl\_bs} \cdot \text{KSTR} \cdot \text{KTOTAL} \qquad (11)$$

It should be noted that the fuel injection control process described heretofore may be configured such that when the answer to the question of the step 60 is affirmative (YES), instead of executing the step 62, fuel injection may be stopped.

Figure 23:
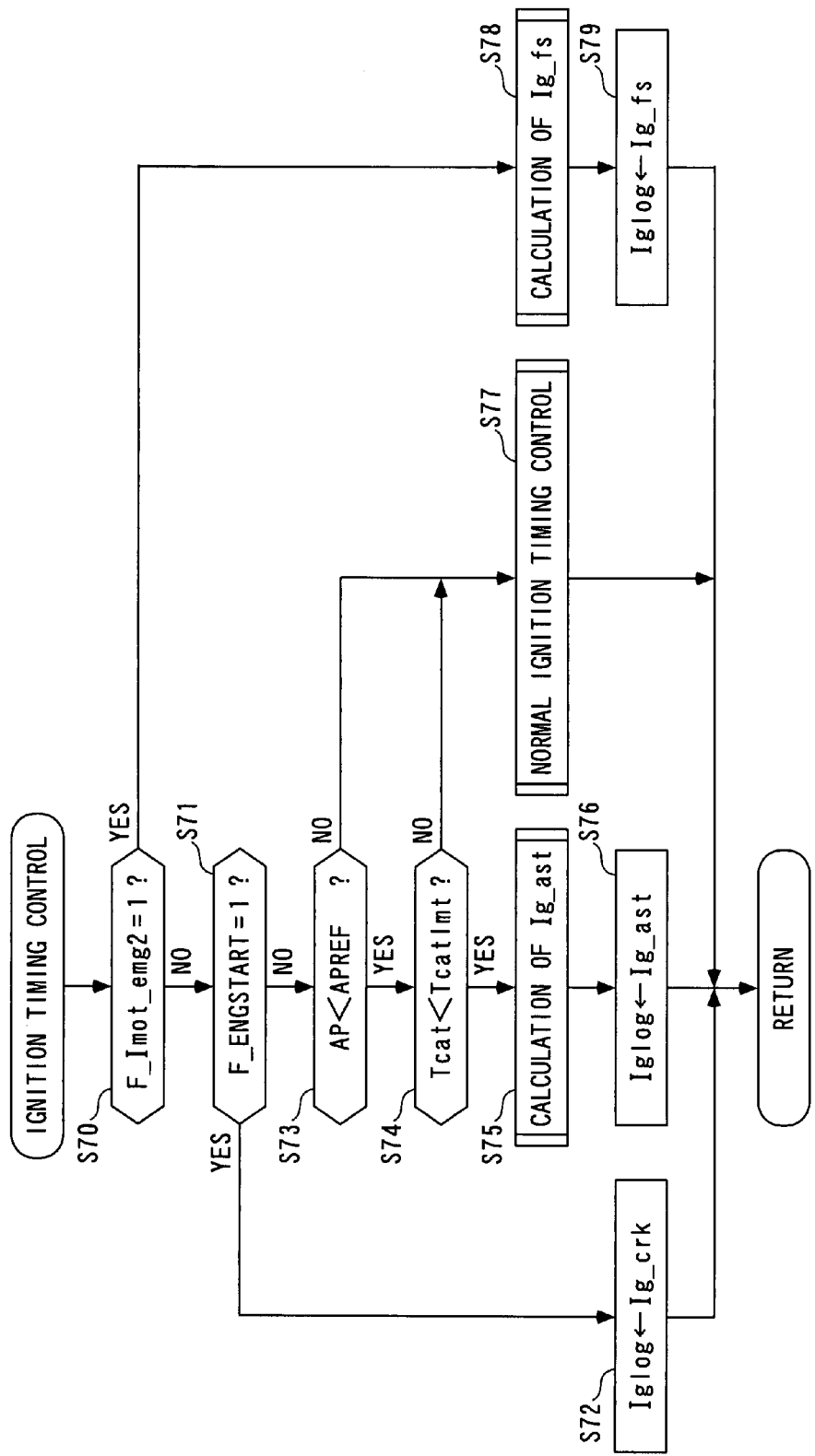
FIG. 23 is a flowchart showing an ignition timing control process.

Next, the ignition timing control process, referred to hereinabove, carried out by the ECU 2 will be described with reference to FIG. 23. In this process, first, it is determined in a step 70 whether or not the aforementioned second overcurrent determination flag F_Imot_emg2 is equal to 1. If the answer to this question is negative (NO), i.e. if the variable valve lift mechanism 50 is normal, the process proceeds to a step 71, wherein it is determined whether or not the aforementioned engine start flag F_ENGSTART is equal to 1. If the answer to the question is affirmative (YES), i.e. if the engine starting control is being executed, the process proceeds to a step 72, wherein the ignition timing Iglog is set to a predetermined start-time value Ig_crk (e.g. BTDC 10°) for starting of the engine 3, followed by terminating the present process.

On the other hand, if the answer to the question of the step 71 is negative (NO), i.e. if the engine starting control is not being executed, the process proceeds to a step 73, wherein it is determined whether or not the accelerator pedal opening AP is smaller than the aforementioned predetermined value APREF. If the answer to this question is affirmative (YES), i.e. if the accelerator pedal is not stepped on, the process proceeds to a step 74, wherein it is determined whether or not the timer count value Tcat of the catalyst warmup timer is smaller than a predetermined value Tcatlmt.

If the answer to this question is affirmative (YES), i.e. if Tcat<Tcatlmt holds, it is judged that the catalyst warmup control should be executed, so that the process proceeds to a step 75, wherein a catalyst warmup value Ig_ast is calculated. More specifically, the catalyst warmup value Ig_ast is calculated with a sliding mode control algorithm expressed by the following equations (12) to (14).

$$\text{Ig\_ast}(m) = \text{Ig\_ast\_base} - Krch \cdot \sigma(m) - Kadp \cdot \sum_{i=0}^{m} \sigma(i) \qquad (12)$$

$$\sigma(m) = Enast(m) + \text{pole} \cdot Enast(m-1) \qquad (13)$$

$$Enast(m) = NE(m) - \text{NE\_ast} \qquad (14)$$

In the above equations (12) to (14), a symbol (m) in discrete data indicates that the data is sampled (or calculated) in synchronism with the repetition period of generation of the TDC signal. This also applies to the discrete data. It should be noted that in the following description, the symbol m and the like provided for the discrete data are omitted as deemed appropriate.

In the equation (12), Ig_ast_base represents a predetermined catalyst warmup reference ignition timing (e.g. BTDC 5°), and Krch and Kadp represent predetermined feedback gains. Further, σ represents a switching function defined by the equation (13). In the equation (13), pole represents a switching function-setting parameter set to a value which satisfies the relationship of −1<pole<0, and Enast represents a follow-up error calculated by the equation (14). In the equation (14), NE_ast represents a predetermined catalyst warmup target engine speed (e.g. 1800 rpm). With the above-described control algorithm, the catalyst warmup value Ig_ast is calculated as a value for causing the engine speed NE to converge to the catalyst warmup target engine speed NE_ast.

Then, the process proceeds to a step 76, wherein the ignition timing Iglog is set to the catalyst warmup value Ig_ast, followed by terminating the present process.

On the other hand, if the answer to the question of the step 73 or the step 74 is negative (NO), i.e. if the accelerator pedal is stepped on, or if Tcat≧Tcatlmt holds, the process proceeds to a step 77, wherein a normal ignition timing control process is carried out.

Figure 24:
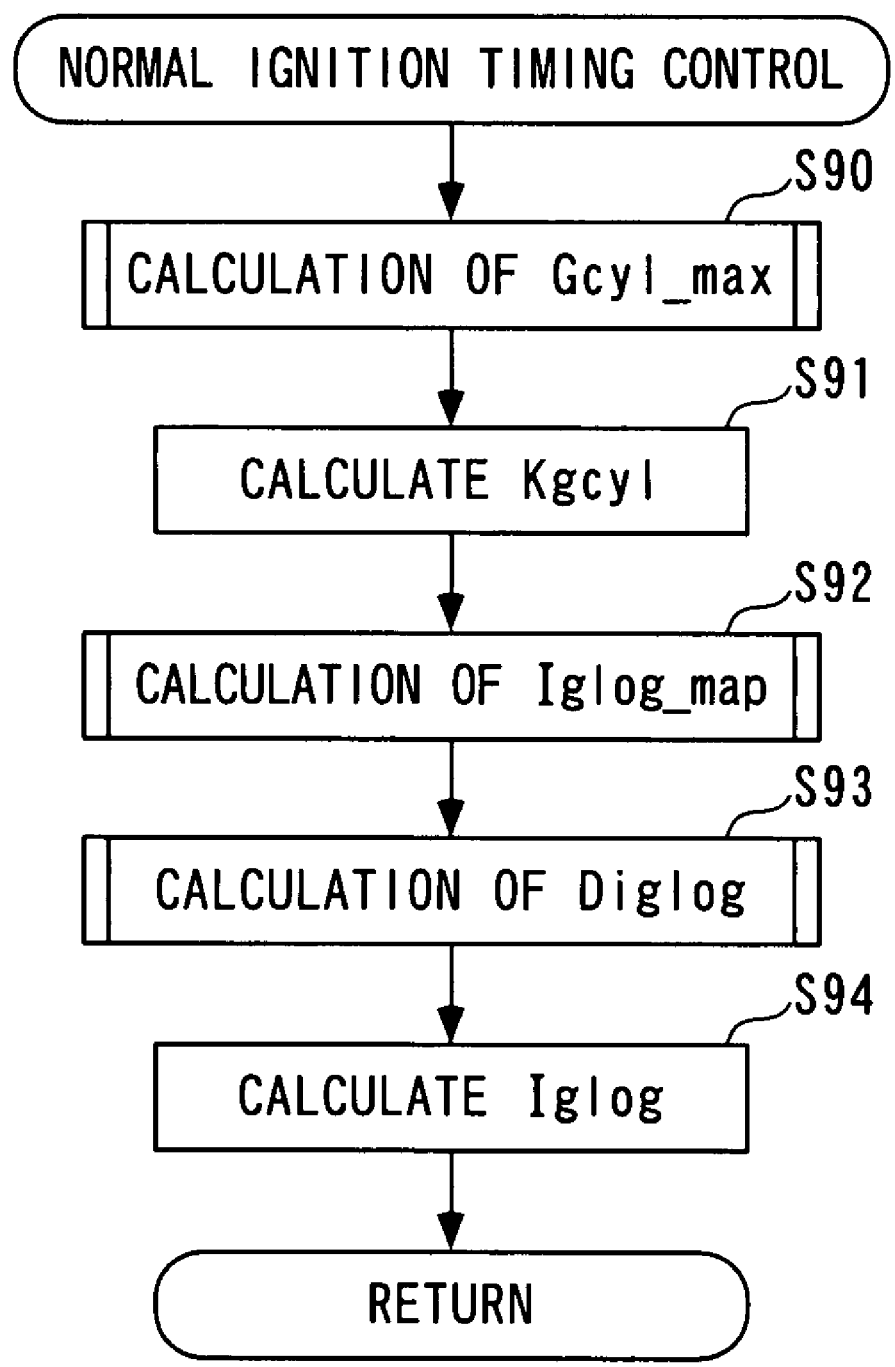
FIG. 24 is a flowchart showing a normal ignition timing control process.

More specifically, the normal ignition timing control process is executed as shown in FIG. 24. First, in a step 90, a maximum intake air amount Gcyl_max is calculated. More specifically, a basic value Gcyl_max_base of the maximum intake air amount is calculated by searching a table, not shown, according to the engine speed NE, and a correction coefficient K_gcyl_max is calculated by searching a map, not shown, according to the engine speed NE and the cam phase Cain. Then, the maximum intake air amount Gcyl_max is calculated based on the thus calculated values Gcyl_max_base and K_gcyl_max by the following equation (15):

$$\text{Gcyl\_max} = K\_{gcyl}\_\text{max} \cdot \text{Gcyl\_max\_base} \qquad (15)$$

Then, in a step 91, the normalized intake air amount Kgcyl is calculated by the following equation (16):

$$Kgcyl = \frac{Gcyl}{\text{Gycl\_max}} \qquad (16)$$

Next, the process proceeds to a step 92, wherein the basic ignition timing Iglog_map is calculated. More specifically, a plurality of values are selected by searching a plurality of maps, not shown, according to the normalized intake air amount Kgcyl, the engine speed NE, and the cam phase Cain, and the basic ignition timing Iglog_map is calculated by interpolation of the selected values.

Then, in a step 93, an ignition correction value Diglog is calculated. More specifically, various correction values are calculated by searching maps and tables, none of which are shown, according to the intake air temperature TA, the engine coolant temperature TW, the target air-fuel ratio KCMD, and so forth, and the ignition correction value Diglog is calculated based on the calculated correction values.

Then, in a step 94 following the step 93, the ignition timing Iglog is calculated by the following equation (17), followed by terminating the present process.

$$Iglog = Iglog\_map + Diglog \quad (17)$$

Referring again to FIG. 23, after carrying out the normal ignition timing control process as described above, in the step 77, the present process is terminated.

On the other hand, if the answer to the question of the step 70 is affirmative (YES), i.e. if the variable valve lift mechanism 50 is faulty, the process proceeds to a step 78, wherein a failure-time value Ig_fs is calculated. More specifically, the failure-time value Ig_fs is calculated with a sliding mode control algorithm expressed by the following equations (18) to (20).

$$Ig\_fs(m) = Ig\_fs\_base - Krch^{\#} \cdot \sigma^{\#}(m) - Kadp^{\#} \cdot \sum_{i=0}^{m} \sigma^{\#}(i) \quad (18)$$

$$\sigma^{\#}(m) = Enfs(m) + pole^{\#} \cdot Enfs(m-1) \quad (19)$$

$$Enfs(m) = NE(m) - NE\_fs \quad (20)$$

In the above equation (18), Ig_fs_base represents a predetermined reference ignition timing (e.g. TDC±0°) for a failure time, and $Krch^{\#}$ and $Kadp^{\#}$ represent predetermined feedback gains, respectively. Further, $\sigma^{\#}$ represents a switching function defined by the equation (19). In the equation (19), $pole^{\#}$ represents a switching function-setting parameter set to a value which satisfies the relationship of $-1 < pole^{\#} < 0$, and Enfs represents a follow-up error calculated by the equation (20). In the equation (20), NE_fs represents a predetermined failure-time target engine speed (e.g. 2000 rpm). With the above control algorithm, the failure-time value Ig_fs is calculated as a value for causing the engine speed NE to converge to the failure-time target engine speed NE_fs.

Then, the process proceeds to a step 79, wherein the ignition timing Iglog is set to the failure-time value Ig_fs, followed by terminating the present process.

It should be noted that in the ignition timing control process, when the answer to the question of the step S70 is affirmative (YES), instead of executing the steps 78 and 79, ignition may be stopped.

As described above, according to the control system 1 of the present embodiment, the current value Imot and the sampling time period Stime are multiplied by each other to calculate the cumulative value Simot, and the cumulative value SImot is compared with the first and second predetermined reference values Simot_J1 and Simot_J2. Then, if Simot≧Simot_J1 holds, i.e. if the lift actuator 60 of the variable valve lift mechanism 50 is in a condition close to the overcurrent and overloaded state, the target value filter-setting parameter pole_f_lf and the switching function-setting parameter pole_lf are set to respective predetermined failure-time values pole_f_lf_J1 and pole_lf_J1, and by using the thus set two parameters pole_f_lf and pole_lf, the lift control input U_Liftin to the variable valve lift mechanism 50 is calculated with the target value filter-type two-degree-of-freedom sliding mode control algorithm expressed by the equations (2) to (5).

The predetermined failure-time values pole_f_lf_J1 and pole_lf_Ja are set to respective values closer to a value of −1 than the normal-time values pole_f_lf_S1 and pole_lf_S1 used when Simot<Simot_J1 holds, and hence by the above-described features of the control algorithm, the convergence speed of the filtered value Liftin_cmd_f of the target valve lift to the target valve lift Liftin_cmd is set to a lower value, and the degree of suppression of the disturbance becomes smaller, whereby the generation of a larger follow-up error E_lf is permitted. This causes the lift control input U_Liftin i.e. the current value Imot flowing through the lift actuator 60 to be changed to a smaller value, when the variable valve lift mechanism 50 is in a condition close to the overcurrent and overloaded state, which makes it possible to prevent the lift actuator 60, i.e. the variable valve lift mechanism 50 from entering the overcurrent and overloaded state. That is, as distinct from the prior art, it is possible to avoid the overloaded state of the variable valve lift mechanism 50 and hence reduce the manufacturing cost, without using sensors or the like.

Further, if Simot≧Simot_J2 holds, the lift control input U_Liftin is set to the predetermined failure-time value U_Liftin_fs. In this case, since Simot_J2>Simot_J1 holds, before this condition is satisfied, Simot≧Simot_J1 holds, which means that the current value Imot has already been changed to a smaller value. Therefore, in spite of this, if the cumulative value Simot further increases to become larger than the second reference value Simot_J2, it can be concluded that the variable valve lift mechanism 50 is faulty. Therefore, when the variable valve lift mechanism 50 is faulty, it is possible to positively avoid the overloaded state of the variable valve lift mechanism 50 from continuing.

Further, in determining whether or not the variable valve lift mechanism 50 is in the condition close to the overcurrent and overloaded state, or whether the same is in the overcurrent and overloaded state, the value Simot obtained by cumulative calculation of the product of the current value Imot and the sampling time period Stime, and hence compared with the conventional method (or the case where a cumulative value Simot2 calculated by an equation (21), referred to hereinafter, is used), it is possible to properly set the first and second predetermined reference values Simot_J1 and Simot_J2. This makes it possible to carry out the above-mentioned determination more accurately and thereby more positively avoid the overloaded state of the variable valve lift mechanism 50.

Further, when the current value Imot is not less than the upper limit value Imot_max, the calculation of the cumulative value Simot is executed, and when Imot<Imot_max holds, the cumulative value Simot is reset to a value of 0, so that only when the variable valve lift mechanism 50 continues to be in the overcurrent state or in a condition close thereto, the cumulative value SImot is calculated, and based on the thus calculated cumulative value Simot, it is possible to determine whether or not the variable valve lift mechanism 50 is in the overloaded state or in the condition close thereto. This makes it possible to execute the determination promptly and accurately.

Further, when the first and second overcurrent determination flags F_Imot_emg1 and F_Imot_emg2 are set to 1 when Simot≧Simot_J1 and Simot≧Simot_J2 hold, and the values of these flags F_Imot_emg1 and F_Imot_emg2 are stored in the RAM 2b. Further, the values of these flags F_Imot_emg1 and F_Imot_emg2 are maintained in the RAM 2b even after the IG•SW29 is turned off unless a predetermined reset condition is satisfied to set the reset flag F_RESET to 1. This makes it possible to confirm e.g. during maintenance whether or not the variable valve lift mechanism 50 is faulty and whether or not the same suffers from occurrence of the condition close to the overcurrent and overloaded state.

Further, only by changing the two parameters pole_f_lf and pole_lf, the lift control input U_Liftin to the variable valve lift mechanism 50 can be changed to a smaller value. In other words, as is distinct from the optimum regulation algorithm and the PID control algorithm, it is unnecessary to change the gain of a proportional term and that of an integral term, and hence the balance of the gains is not lost, which prevents the stability of the control system from being degraded. As a result, without degrading the stability of the control system, it is possible to avoid the overloaded state of the variable valve lift mechanism 50.

Figure 25:
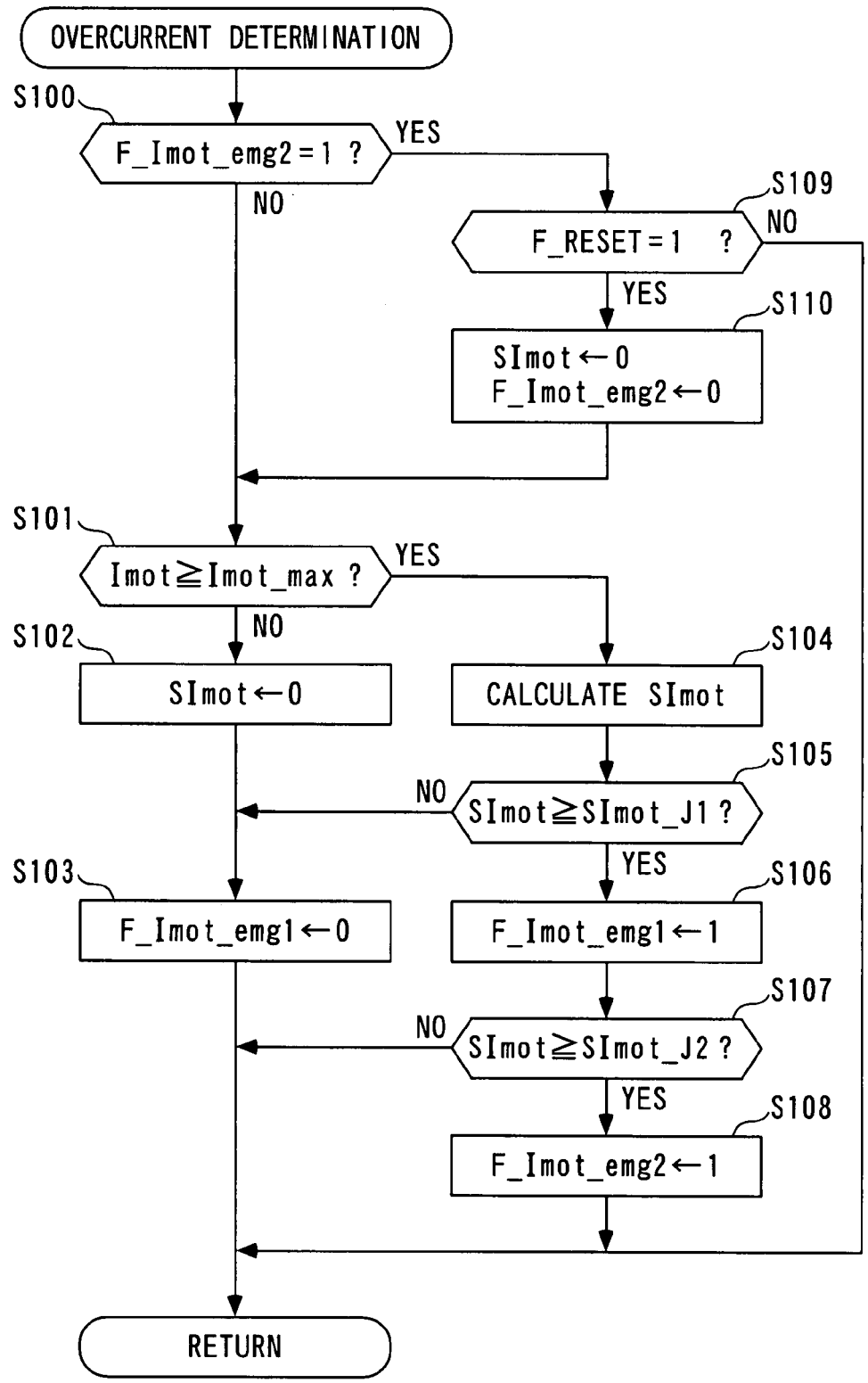
FIG. 25 is a flowchart showing a variation of the overcurrent determination process.

It should be noted that in stead of executing the overcurrent determination process of the embodiment described hereinabove with reference to FIG. 13, an overcurrent determination process shown in FIG. 25 may be executed. As shown in FIG. 25, this overcurrent determination process has the same configuration as that of the FIG. 13 overcurrent determination process, except for steps 103 and 110, and hence a description will be given hereinafter mainly of points different from the FIG. 13 overcurrent determination process.

In this process, in a step 101, it is determined whether or not the current value Imot is not less than a predetermined upper limit value Imot_max (predetermined threshold value). If the answer to this question is negative (NO), if Imot<Imot_max holds, it is judged that the lift actuator 60 is not in the overcurrent and overloaded state, so that the process proceeds to a step 102, wherein the cumulative value Simot is set to a value of 0. Then, in a step 103, the first overcurrent determination flag F_Imot_emg1 is set to 0, followed by terminating the present process.

On the other hand, if the answer to the question of the step 101 is affirmative (YES), i.e. if Imot≧Imot_max holds, in a step 104, the cumulative value Simot is calculated by the aforementioned equation (1), and stored in the RAM 2b. Then, in a step 105, it is determined whether or not the cumulative value Simot is not less than a first predetermined reference value Simot_J1. If the answer to this question is negative (NO), the aforementioned step 103 is executed, followed by terminating the present process.

On the other hand, if the answer to the question of the step 105 is affirmative (YES), i.e. if Simot≧Simot_J1 holds, the process proceeds to a step 106, wherein the first overcurrent determination flag F_Imot_J1 is set to 1, and stored in the RAM 2b. Then, similarly to the steps 16 and 17 described hereinabove, steps 107 and 108 are executed, followed by terminating the present process.

Further, in a step 109, it is determined whether or not the reset flag F_RESET is equal to 1, and if the answer to this question is negative (NO), the present process is immediately terminated. On the other hand, if the answer to this question is affirmative (YES), in a step 110, the cumulative value Simot is reset to 0, and the second overcurrent determination flag F_Imot_emg2 is reset to 0. Then, the step 101 et seq. are executed as described above, followed by terminating the present process.

As described heretofore, in this overcurrent determination process, if Imot<Imot_max holds, the first overcurrent determination flag F_Imot_emg1 is set to 0, and hence the answer to the question of the step 30 described hereinabove with reference to FIG. 14 becomes negative (NO), so that in the step 31, the target value filter-setting parameter pole_f_lf is set to the predetermined normal-time value pole_f_lf_S1, and the switching function-setting parameter pole_if is set to the predetermined normal-time value pole_f_lf_S1. This causes the lift control input U_Liftin to be made larger than when pole_f_if =pole_f_lf_J1 and pole_lf=pole_lf_J1 hold. That is, when the lift actuator 60 is in a condition close to the overloaded state, the two parameters pole_f_lf and pole_if are set to the respective predetermined failure-time values pole_f_lf_J1 and pole_lf_J1, whereby the condition of the lift actuator 60 close to the overloaded state can be avoided. Then, when the condition of Imot<Imot_ax is satisfied, the two parameters pole_f_if and pole_if are set to the respective predetermined normal-time values pole_f_lf_S1 and pole_lf_S1, whereby the lift actuator 60 is driven with a larger driving force than when the two parameters are set to the respective failure-time values. Then, when the condition of Imot ≧Imot_max is satisfied again, the above-described operations are repeatedly carried out.

In other words, in the case of the above-described embodiment, once the two parameters pole_f_lf and pole_lf are set to the respective predetermined failure-time values pole_f_lf_J1 and pole_lf_J1, unless the reset condition is satisfied, the above state is held to cause the lift actuator 60 to continue to be driven with a smaller drive force, whereas in the example shown in FIG. 25, as the condition of the lift actuator 60 close to the overloaded state disappears, the driving force of the lift actuator 60 can be automatically increased. As a result, it is possible to enhance the drivability of the engine 3.

Although in the above-described embodiment, the variable valve lift mechanism 50 of the engine 3 is used as the actuator, and the valve lift Liftin as the control amount is controlled via the variable valve lift mechanism 50, the control system according to the present invention is not limited to this, but can be applied to various industrial machines which have the control amount thereof controlled via an actuator.

Further, although in the above-described embodiment, the variable valve lift mechanism 50 of an electric motor type is used as the actuator, the actuator according to the present invention is not limited to this, but it may be any suitable actuator so long as it is an electric actuator that converts the supply power into the driving force. For example, as the actuator, there may be used a solenoid actuator that is provided with a solenoid.

Further, although in the present embodiment, the current value Imot is used as the power parameter by way of example, the power parameter is not limited to this, but it may be any suitable parameter which represents the electric power supplied to the actuator. For example, the voltage value of the actuator may be used as the power parameter, and in this case, it is only required to use a voltage sensor as the power parameter-detecting means.

Further, in the above-described embodiment, the cumulative value Simot is used as the load parameter by way of example, this is not limitative, but any suitable load parameter may be used insofar as it represents load on the actuator. For example, as the load parameter, a cumulative value Simot2 calculated by the following equation (21) may be used, and in the above-described overcurrent determination process, the cumulative value Simot2 may be compared with a predetermined reference value. It should be noted that the cumulative value Simot2 is calculated as a value proportional to the amount of heat generated by the electric motor 61 of the lift actuator 60.

$$SImot2(k)=SImot2(K-1)+Imot(k)^{2 \cdot Stime} \qquad (21)$$

Further, in the above-described embodiment, the target value filter-type two-degree-of-freedom sliding mode control algorithm expressed by the equations (2) to (5) is used as the predetermined control algorithm by way of example, this is not limitative, but there may be used any suitable control algorithm insofar as it can calculate the supply power to the actuator such that the control amount follows up the target control amount. For example, there may be used a general feedback control algorithm, such as the PID control algorithm, a response-specifying control algorithm, such as a back-stepping control algorithm, or the like, as the predetermined control algorithm.

Further, although in the above-described embodiment, as the response-specifying control algorithm, the sliding mode control algorithm expressed by the equations (2) to (4) is used by way of example, but instead of this, there may be used another response-specifying control algorithm, such as the back-stepping control algorithm.

Further, in the above-described embodiment, as the target value filter-type two-degree-of-freedom control algorithm, the target value filter-type two-degree-of-freedom control algorithm expressed by the equations (2) to (5) is used by way of example, this is not limitative, but any suitable target value filter-type two-degree-of-freedom control algorithm may be used insofar as it is a combination of a target value filter-type algorithm and a feedback control algorithm. For example, there may be used a target value filter-type two-degree-of-freedom control algorithm which is a combination of a target value filter algorithm and a PID control algorithm.

Further, in the above-described embodiment, when $F\_Imot\_emg1=1$ holds, the tow parameters pole_f_lf and pole_lf are both set to the respective failure-time values pole_f_lf_J1 and pole_lf_J1 by way of example, this is not limitative, but one of the two parameters pole_f_lf and pole_lf may be set to the failure-time value thereof.

INDUSTRIAL APPLICABILITY

The control system according to the invention is capable of avoiding the overloaded state of an actuator without using sensors or the like, and therefore is advantageously applicable to various industrial machines in which a control amount is controlled via the actuator.

The invention claimed is:

1. A control system for controlling a control amount via an actuator that converts supply power into a driving force, comprising:
   control amount-detecting means for detecting the control amount;
   target control amount-setting means for setting a target control amount as a target to which the control amount is controlled;
   supply power-calculating means for calculating the supply power to the actuator with a predetermined control algorithm such that the detected control amount follows up the target control amount;
   power parameter-detecting means for detecting a power parameter indicative of electric power actually supplied to the actuator;
   load parameter-calculating means for calculating a load parameter indicative of load on the actuator, based on the detected power parameter; and
   first determination means for determining whether or not the load parameter is not smaller than a first predetermined reference value;
   wherein the predetermined control algorithm includes at least one of a follow-up parameter that determines a follow-up property of the control amount to the target control amount, and a disturbance suppression parameter that determines a degree of suppression of influence of disturbance applied to the actuator, and
   wherein said supply power-calculating means sets the at least one of the follow-up parameter and the disturbance suppression parameter to a first predetermined value that causes the supply power to become smaller when said first determination means determines that the load parameter is not smaller than the first predetermined reference value, than when said first determination means determines that the load parameter is smaller than the first predetermined reference value.

2. A control system as claimed in claim 1, wherein the power parameter is a value of electric current actually flowing through the actuator; and
   wherein said load parameter-calculating means calculates the load parameter by multiplying the detected value of electric current by a time period over which the electric current has flowed.

3. A control system as claimed in claim 1 or 2, further comprising second determination means for determining whether or not the load parameter is not smaller than a second predetermined reference value which is larger than the first predetermined reference value, and
   wherein said supply power-calculating means sets the supply power to a predetermined failure-time value when said second determination means determines that the load parameter is not smaller than the second predetermined reference value.

4. A control system as claimed in claim 3, further comprising:
   storage means for storing respective results of determinations by said first determination means and said second determination means; and
   reset means for resetting the respective results of determinations by said first determination means and said second determination means, when a predetermined reset condition is satisfied.

5. A control system as claimed in claim 1, further comprising power parameter-determination means for determining whether or not the power parameter is not smaller than a predetermined threshold value, and
   wherein in a case where said first determination means determines that the load parameter is not smaller than the first predetermined reference value, when said power parameter-determining means determines that the power parameter is smaller than the predetermined threshold value, said supply power-calculating means sets the at least one of the follow-up parameter and the disturbance suppression parameter to a second predetermined value that causes the supply power to become larger than when the at least one of the follow-up parameter and the disturbance suppression parameter is set to the first predetermined value.

6. A control system for controlling a control amount via an actuator that converts supply power into a driving force, comprising:
   supply power-calculating means for calculating supply power to the actuator;
   current value-detecting means for detecting a value of electric current flowing through the actuator;
   load parameter-calculating means for calculating a load parameter indicative of load on the actuator by cumulative calculation of a product of the detected value of electric current and a time period over which the electric current has flowed;

and determination means for determining whether or not the load parameter is not smaller than a predetermined reference value,
wherein said supply power-calculating means sets the supply power to a predetermined failure-time value when said determination means determines that the load parameter is not smaller than the predetermined reference value.

7. A control system as claimed in claim 6, further comprising storage means for storing a result of determination by said determination means; and
reset means for resetting the result of determination by said determination means stored in said storage means, when a predetermined reset condition is satisfied.

8. A control system as claimed in claim 2 or 6, wherein said load parameter-calculating means carries out cumulative calculation of the load parameter when the value of electric current is not smaller than a predetermined current value, and resets the load parameter to a value of 0 when the value of electric current is smaller than the predetermined current value.

9. A control system as claimed in any one of claims 1, 2, 5, 6 or 7, wherein the actuator is used in a variable valve lift mechanism that changes, as the control amount, a valve lift which is a lift of at least one of an intake valve and an exhaust valve of an internal combustion engine.

10. A control system as claimed in any one of claims 1, 2, 5, 6 or 7, wherein the predetermined control algorithm includes a predetermined response-specifying control algorithm, and
wherein said disturbance suppression parameter is a response-specifying parameter in the predetermined response-specifying control algorithm, the response-specifying parameter designating convergence speed and convergence behavior of a difference between the control amount and the target control amount, the difference being converged to a value of 0.

11. A control system as claimed in any one of claims 1, 2, 5, 6 or 7, wherein the predetermined control algorithm includes a target value filter-type two-degree-of-freedom control algorithm as a combination of a predetermined target value filter algorithm that calculates a filtered value of the target control amount, and a predetermined feedback control algorithm for converging the control amount to the filtered value, and
wherein the follow-up parameter is a target value filter-setting parameter in the target value filter algorithm, for setting follow-up speed of the filtered value to the target control amount.

* * * * *